US011794282B2

(12) United States Patent
Martinsen et al.

(10) Patent No.: US 11,794,282 B2
(45) Date of Patent: Oct. 24, 2023

(54) FINE-SCALE TEMPORAL CONTROL FOR LASER MATERIAL PROCESSING

(71) Applicant: nLIGHT, Inc., Camas, WA (US)

(72) Inventors: Robert J. Martinsen, West Linn, OR (US); Qi Wang, Portland, OR (US)

(73) Assignee: nLIGHT, Inc., Camas, WA (US)

( * ) Notice: Subject to any disclaimer, the term of this patent is extended or adjusted under 35 U.S.C. 154(b) by 0 days.

(21) Appl. No.: 17/745,669

(22) Filed: May 16, 2022

(65) Prior Publication Data

US 2022/0274203 A1  Sep. 1, 2022

Related U.S. Application Data

(63) Continuation of application No. 16/569,403, filed on Sep. 12, 2019, now Pat. No. 11,331,756, which is a
(Continued)

(51) Int. Cl.
*B23K 26/342* (2014.01)
*B33Y 30/00* (2015.01)
(Continued)

(52) U.S. Cl.
CPC ............ *B23K 26/342* (2015.10); *B22F 10/28* (2021.01); *B22F 10/36* (2021.01); *B22F 10/366* (2021.01);
(Continued)

(58) Field of Classification Search
CPC ......... B33Y 30/00; B33Y 40/00; B33Y 50/02; B22F 10/20; B22F 10/30; G02B 26/0875;
(Continued)

(56) References Cited

U.S. PATENT DOCUMENTS 3,388,461 A  6/1968  Lins
4,138,190 A  2/1979  Bryngdahl
(Continued)

FOREIGN PATENT DOCUMENTS

BY  12235  8/2009
CA  2292974 A1  6/2000
(Continued)

OTHER PUBLICATIONS

3-Axis Laser Scanning Systems, downloaded from http://www.camtech.com/index.php?option=com_content&view=article&id=131&Itemid=181, 4 pages, Dec. 31, 2014.
(Continued)

*Primary Examiner* — Brian W Jennison
(74) *Attorney, Agent, or Firm* — Klarquist Sparkman, LLP

(57) ABSTRACT

Methods include directing a laser beam to a target along a scan path at a variable scan velocity and adjusting a digital modulation during movement of the laser beam along the scan path and in relation to the variable scan velocity so as to provide a fluence at the target within a predetermined fluence range along the scan path. Some methods include adjusting a width of the laser beam with a zoom beam expander. Apparatus include a laser source situated to emit a laser beam, a 3D scanner situated to receive the laser beam and to direct the laser beam along a scan path in a scanning plane at the target, and a laser source digital modulator coupled to the laser source so as to produce a fluence at the scanning plane along the scan path that is in a predetermined fluence range as the laser beam scan speed changes along the scan path.

18 Claims, 10 Drawing Sheets

Related U.S. Application Data continuation of application No. 15/357,484, filed on Nov. 21, 2016, now Pat. No. 10,434,600.

(60) Provisional application No. 62/292,108, filed on Feb. 5, 2016, provisional application No. 62/258,774, filed on Nov. 23, 2015.

(51) Int. Cl.

| | | |
|---|---|---|
| *B33Y 50/02* | (2015.01) | |
| *B22F 10/28* | (2021.01) | |
| *B22F 12/44* | (2021.01) | |
| *B22F 12/49* | (2021.01) | |
| *B22F 10/36* | (2021.01) | |
| *B22F 10/366* | (2021.01) | |
| *B33Y 10/00* | (2015.01) | |
| *B23K 26/082* | (2014.01) | |
| *G02B 26/08* | (2006.01) | |
| *G02B 26/10* | (2006.01) | |
| *B29C 64/153* | (2017.01) | |
| *B22F 12/41* | (2021.01) | |
| *B22F 12/90* | (2021.01) | |
| *H01S 3/067* | (2006.01) | |
| *H01S 3/16* | (2006.01) | |
| *H01S 3/17* | (2006.01) | |

(52) U.S. Cl.
CPC .............. *B22F 12/44* (2021.01); *B22F 12/49* (2021.01); *B23K 26/082* (2015.10); *B33Y 10/00* (2014.12); *B33Y 30/00* (2014.12); *B33Y 50/02* (2014.12); *G02B 26/0875* (2013.01); *G02B 26/10* (2013.01); *B22F 12/41* (2021.01); *B22F 12/90* (2021.01); *B29C 64/153* (2017.08); *H01S 3/067* (2013.01); *H01S 3/1603* (2013.01); *H01S 3/17* (2013.01); *Y02P 10/25* (2015.11)

(58) Field of Classification Search
CPC ......... G02B 26/10; B29C 64/153; H01S 3/17; H01S 3/1603; H01S 3/067
See application file for complete search history.

(56) References Cited

U.S. PATENT DOCUMENTS

| | | |
|---|---|---|
| 4,252,403 A | 2/1981 | Salisbury |
| 4,266,851 A | 5/1981 | Salisbury |
| 4,315,666 A | 2/1982 | Hicks, Jr. |
| 4,475,027 A | 10/1984 | Pressley |
| 4,475,789 A | 10/1984 | Kahn |
| 4,713,518 A | 12/1987 | Yamazaki et al. |
| 4,863,538 A | 9/1989 | Deckard |
| 4,953,947 A | 9/1990 | Bhagavatula |
| 4,998,797 A | 3/1991 | van den Bergh et al. |
| 5,008,555 A | 4/1991 | Mundy |
| 5,082,349 A | 1/1992 | Cordova-Plaza et al. |
| 5,129,014 A | 7/1992 | Bloomberg |
| 5,153,773 A | 10/1992 | Muraki et al. |
| 5,252,991 A | 10/1993 | Storlie et al. |
| 5,319,195 A | 6/1994 | Jones et al. |
| 5,427,733 A | 6/1995 | Benda et al. |
| 5,463,497 A | 10/1995 | Muraki et al. |
| 5,475,415 A | 12/1995 | Noethen |
| 5,475,704 A | 12/1995 | Lomashevich |
| 5,509,597 A | 4/1996 | Laferriere |
| 5,523,543 A | 6/1996 | Hunter, Jr. et al. |
| 5,530,221 A | 6/1996 | Benda et al. |
| 5,566,196 A | 10/1996 | Scifres |
| 5,642,198 A | 6/1997 | Long |
| 5,684,642 A | 11/1997 | Zumoto et al. |
| 5,719,386 A | 2/1998 | Hsieh et al. |
| 5,745,284 A | 4/1998 | Goldberg et al. |
| 5,748,824 A | 5/1998 | Smith |
| 5,761,234 A | 6/1998 | Craig et al. |
| 5,818,630 A | 10/1998 | Fermann et al. |
| 5,832,415 A | 11/1998 | Wilkening et al. |
| 5,837,962 A | 11/1998 | Overbeck |
| 5,841,465 A | 11/1998 | Fukunaga et al. |
| 5,864,430 A | 1/1999 | Dickey et al. |
| 5,903,696 A | 5/1999 | Krivoshlykov |
| 5,909,306 A | 6/1999 | Goldberg et al. |
| 5,932,119 A | 8/1999 | Kaplan et al. |
| 5,986,807 A | 11/1999 | Fork |
| 5,999,548 A | 12/1999 | Mori et al. |
| 6,072,184 A | 6/2000 | Okino et al. |
| 6,132,104 A | 10/2000 | Bliss et al. |
| 6,180,912 B1 | 1/2001 | Tatah |
| 6,192,171 B1 | 2/2001 | Goodman et al. |
| 6,265,710 B1 | 7/2001 | Walter |
| 6,275,630 B1 | 8/2001 | Yang et al. |
| 6,310,995 B1 | 10/2001 | Saini et al. |
| 6,330,382 B1 | 12/2001 | Harshbarger et al. |
| RE37,585 E | 3/2002 | Mourou et al. |
| 6,353,203 B1 | 3/2002 | Hokodate et al. |
| 6,360,042 B1 | 3/2002 | Long |
| 6,362,004 B1 | 3/2002 | Noblett |
| 6,426,840 B1 | 7/2002 | Partanen et al. |
| 6,433,301 B1 | 8/2002 | Dunsky et al. |
| 6,434,177 B1 | 8/2002 | Jurgensen |
| 6,434,302 B1 | 8/2002 | Fidric et al. |
| 6,477,301 B1 | 11/2002 | Anthon et al. |
| 6,483,973 B1 | 11/2002 | Mazzarese et al. |
| 6,490,376 B1 | 12/2002 | Au et al. |
| 6,496,301 B1 | 12/2002 | Koplow et al. |
| 6,542,665 B2 | 4/2003 | Reed et al. |
| 6,556,340 B1 | 4/2003 | Wysocki et al. |
| 6,569,382 B1 | 5/2003 | Edman et al. |
| 6,577,314 B1 | 6/2003 | Yoshida et al. |
| 6,600,149 B2 | 7/2003 | Schulz et al. |
| 6,639,177 B2 | 10/2003 | Ehrmann et al. |
| 6,671,293 B2 | 12/2003 | Kopp et al. |
| 6,711,918 B1 | 3/2004 | Kliner et al. |
| 6,724,528 B2 | 4/2004 | Koplow et al. |
| 6,772,611 B2 | 8/2004 | Kliner et al. |
| 6,777,645 B2 | 8/2004 | Ehrmann et al. |
| 6,779,364 B2 | 8/2004 | Tankala et al. |
| 6,801,550 B1 | 10/2004 | Snell et al. |
| 6,819,815 B1 | 11/2004 | Corbalis et al. |
| 6,825,974 B2 | 11/2004 | Kliner et al. |
| 6,839,163 B1 | 1/2005 | Jakobson et al. |
| 6,882,786 B1 | 4/2005 | Kliner et al. |
| 6,895,154 B2 | 5/2005 | Johnson et al. |
| 6,917,742 B2 | 7/2005 | Po |
| 6,941,053 B2 | 9/2005 | Lauzon et al. |
| 6,963,062 B2 | 11/2005 | Cyr et al. |
| 6,989,508 B2 | 1/2006 | Ehrmann et al. |
| 7,068,900 B2 | 6/2006 | Croteau et al. |
| 7,079,566 B2 | 7/2006 | Kido et al. |
| 7,099,533 B1 | 8/2006 | Chenard |
| 7,099,535 B2 | 8/2006 | Bhagavatula et al. |
| 7,116,887 B2 | 10/2006 | Farroni et al. |
| 7,146,073 B2 | 12/2006 | Wan |
| 7,148,447 B2 | 12/2006 | Ehrmann et al. |
| 7,151,787 B2 | 12/2006 | Kulp et al. |
| 7,151,788 B2 | 12/2006 | Imakado et al. |
| 7,157,661 B2 | 1/2007 | Amako |
| 7,170,913 B2 | 1/2007 | Araujo et al. |
| 7,174,078 B2 | 2/2007 | Libori et al. |
| 7,184,630 B2 | 2/2007 | Kwon et al. |
| 7,193,771 B1 | 3/2007 | Smith et al. |
| 7,235,150 B2 | 6/2007 | Bischel et al. |
| 7,257,293 B1 | 8/2007 | Fini et al. |
| 7,317,857 B2 | 1/2008 | Manyam et al. |
| 7,318,450 B2 | 1/2008 | Nobili |
| 7,349,123 B2 | 3/2008 | Clarke et al. |
| 7,359,604 B2 | 4/2008 | Po |
| 7,373,070 B2 | 5/2008 | Wetter et al. |
| 7,382,389 B2 | 6/2008 | Cordingley et al. |
| 7,394,476 B2 | 7/2008 | Cordingley et al. |
| 7,421,175 B2 | 9/2008 | Varnham |

(56) References Cited

U.S. PATENT DOCUMENTS

| | | |
|---|---|---|
| 7,437,041 B2 | 10/2008 | Po |
| 7,463,805 B2 | 12/2008 | Li et al. |
| 7,526,166 B2 | 4/2009 | Bookbinder et al. |
| 7,527,977 B1 | 5/2009 | Fruetel et al. |
| 7,537,395 B2 | 5/2009 | Savage-Leuchs |
| 7,592,568 B2 | 9/2009 | Varnham et al. |
| 7,593,435 B2 | 9/2009 | Gapontsev et al. |
| 7,622,710 B2 | 11/2009 | Gluckstad |
| 7,628,865 B2 | 12/2009 | Singh |
| 7,748,913 B2 | 7/2010 | Oba |
| 7,764,854 B2 | 7/2010 | Fini |
| 7,781,778 B2 | 8/2010 | Moon et al. |
| 7,783,149 B2 | 8/2010 | Fini |
| 7,834,293 B2 | 11/2010 | Wile et al. |
| 7,835,608 B2 | 11/2010 | Minelly et al. |
| 7,839,901 B2 | 11/2010 | Meleshkevich et al. |
| 7,876,495 B1 | 1/2011 | Minelly |
| 7,880,961 B1 | 2/2011 | Feve et al. |
| 7,920,767 B2 | 4/2011 | Fini |
| 7,924,500 B1 | 4/2011 | Minelly |
| 7,925,125 B2 | 4/2011 | Cyr et al. |
| 7,955,905 B2 | 6/2011 | Cordingley et al. |
| 7,955,906 B2 | 6/2011 | Cordingley et al. |
| 8,027,555 B1 | 9/2011 | Kliner et al. |
| 8,071,912 B2 | 12/2011 | Costin, Sr. et al. |
| 8,217,304 B2 | 7/2012 | Cordingley et al. |
| 8,237,788 B2 | 8/2012 | Cooper et al. |
| 8,243,764 B2 | 8/2012 | Tucker et al. |
| 8,251,475 B2 | 8/2012 | Murray et al. |
| 8,269,108 B2 | 9/2012 | Kunishi et al. |
| 8,270,441 B2 | 9/2012 | Rogers et al. |
| 8,270,445 B2 | 9/2012 | Morasse et al. |
| 8,278,591 B2 | 10/2012 | Chouf et al. |
| 8,288,679 B2 | 10/2012 | Unrath |
| 8,288,683 B2 | 10/2012 | Jennings et al. |
| 8,310,009 B2 | 11/2012 | Saran et al. |
| 8,317,413 B2 | 11/2012 | Fisher et al. |
| 8,362,391 B2 | 1/2013 | Partlo et al. |
| 8,395,084 B2 | 3/2013 | Tanaka |
| 8,404,998 B2 | 3/2013 | Unrath et al. |
| 8,411,710 B2 | 4/2013 | Tamaoki |
| 8,414,264 B2 | 4/2013 | Bolms et al. |
| 8,415,613 B2 | 4/2013 | Heyn et al. |
| 8,433,161 B2 | 4/2013 | Langseth et al. |
| 8,442,303 B2 | 5/2013 | Cheng et al. |
| 8,472,099 B2 | 6/2013 | Fujino et al. |
| 8,509,577 B2 | 8/2013 | Liu |
| 8,526,110 B1 | 9/2013 | Honea et al. |
| 8,537,871 B2 | 9/2013 | Saracco |
| 8,542,145 B2 | 9/2013 | Galati |
| 8,542,971 B2 | 9/2013 | Chatigny |
| 8,593,725 B2 | 11/2013 | Kliner et al. |
| 8,711,471 B2 | 4/2014 | Liu et al. |
| 8,728,591 B2 | 5/2014 | Inada et al. |
| 8,755,649 B2 | 6/2014 | Yilmaz et al. |
| 8,755,660 B1 | 6/2014 | Minelly |
| 8,774,237 B2 | 7/2014 | Maryashin et al. |
| 8,781,269 B2 | 7/2014 | Huber et al. |
| 8,809,734 B2 | 8/2014 | Cordingley et al. |
| 8,835,804 B2 | 9/2014 | Farmer et al. |
| 8,861,910 B2 | 10/2014 | Yun |
| 8,873,134 B2 | 10/2014 | Price et al. |
| 8,947,768 B2 | 2/2015 | Kliner et al. |
| 8,948,218 B2 | 2/2015 | Gapontsev et al. |
| 8,953,914 B2 | 2/2015 | Genier |
| 8,958,144 B2 | 2/2015 | Rataj et al. |
| 9,014,220 B2 | 4/2015 | Minelly et al. |
| 9,136,663 B2 | 9/2015 | Taya |
| 9,140,873 B2 | 9/2015 | Minelly |
| 9,158,066 B2 | 10/2015 | Fini et al. |
| 9,170,359 B2 | 10/2015 | Van Bommel et al. |
| 9,200,887 B2 | 12/2015 | Potsaid et al. |
| 9,207,395 B2 | 12/2015 | Fini et al. |
| 9,217,825 B2 | 12/2015 | Ye et al. |
| 9,250,390 B2 | 2/2016 | Muendel et al. |
| 9,310,560 B2 | 4/2016 | Chann et al. |
| 9,322,989 B2 | 4/2016 | Fini et al. |
| 9,325,151 B1 | 4/2016 | Fini et al. |
| 9,339,890 B2 | 5/2016 | Woods et al. |
| 9,366,887 B2 | 6/2016 | Tayebati et al. |
| 9,397,466 B2 | 7/2016 | McComb et al. |
| 9,431,786 B2 | 8/2016 | Savage-Leuchs |
| 9,442,252 B2 | 9/2016 | Genier |
| 9,482,821 B2 | 11/2016 | Huber et al. |
| 9,496,683 B1 | 11/2016 | Kanskar |
| 9,507,084 B2 | 12/2016 | Fini et al. |
| 9,537,042 B2 | 1/2017 | Dittli et al. |
| 9,547,121 B2 | 1/2017 | Hou et al. |
| 9,634,462 B2 | 4/2017 | Kliner et al. |
| 9,837,783 B2 | 12/2017 | Kliner et al. |
| 10,048,661 B2 | 8/2018 | Arthur et al. |
| 10,112,262 B2 | 10/2018 | Cheverton et al. |
| 10,207,489 B2 | 2/2019 | Dave et al. |
| 10,214,833 B1 | 2/2019 | Kaehr et al. |
| 10,646,963 B2 | 5/2020 | Victor et al. |
| 10,656,427 B2 | 5/2020 | Rivera et al. |
| 10,656,440 B2 | 5/2020 | Kliner et al. |
| 10,663,767 B2 | 5/2020 | Kliner et al. |
| 10,670,872 B2 | 6/2020 | Karlsen et al. |
| 10,705,348 B2 | 7/2020 | Martinsen et al. |
| 10,730,785 B2 | 8/2020 | Brown et al. |
| 10,751,834 B2 | 8/2020 | Koponen et al. |
| 10,971,885 B2 | 4/2021 | Kliner et al. |
| 2001/0045149 A1 | 11/2001 | Dunsky et al. |
| 2001/0050364 A1 | 12/2001 | Tanaka et al. |
| 2002/0097963 A1 | 7/2002 | Ukechi et al. |
| 2002/0146202 A1 | 10/2002 | Reed et al. |
| 2002/0147394 A1 | 10/2002 | Ellingsen |
| 2002/0158052 A1 | 10/2002 | Ehrmann et al. |
| 2002/0159685 A1 | 10/2002 | Cormack |
| 2002/0168139 A1 | 11/2002 | Clarkson et al. |
| 2002/0176676 A1 | 11/2002 | Johnson et al. |
| 2003/0031407 A1 | 2/2003 | Weisberg et al. |
| 2003/0032204 A1 | 2/2003 | Walt et al. |
| 2003/0043384 A1 | 3/2003 | Hill |
| 2003/0059184 A1 | 3/2003 | Tankala et al. |
| 2003/0095578 A1 | 5/2003 | Kopp et al. |
| 2003/0118305 A1 | 6/2003 | Reed et al. |
| 2003/0174387 A1 | 9/2003 | Eggleton et al. |
| 2003/0213998 A1 | 11/2003 | Hsu et al. |
| 2003/0219208 A1 | 11/2003 | Kwon et al. |
| 2004/0013379 A1 | 1/2004 | Johnson et al. |
| 2004/0031779 A1 | 2/2004 | Cahill et al. |
| 2004/0086245 A1 | 5/2004 | Farroni et al. |
| 2004/0112634 A1 | 6/2004 | Tanaka et al. |
| 2004/0126059 A1 | 7/2004 | Bhagavatula et al. |
| 2004/0207936 A1 | 10/2004 | Yamamoto et al. |
| 2004/0208464 A1 | 10/2004 | Po |
| 2004/0247222 A1 | 12/2004 | Park |
| 2005/0002607 A1 | 1/2005 | Neuhaus et al. |
| 2005/0017156 A1 | 1/2005 | Ehrmann |
| 2005/0027288 A1 | 2/2005 | Oyagi et al. |
| 2005/0041697 A1 | 2/2005 | Seifert et al. |
| 2005/0105854 A1 | 5/2005 | Dong et al. |
| 2005/0168847 A1 | 8/2005 | Sasaki |
| 2005/0185892 A1 | 8/2005 | Kwon et al. |
| 2005/0191017 A1 | 9/2005 | Croteau et al. |
| 2005/0233557 A1 | 10/2005 | Tanaka et al. |
| 2005/0259944 A1 | 11/2005 | Anderson et al. |
| 2005/0265678 A1 | 12/2005 | Manyam et al. |
| 2005/0271340 A1 | 12/2005 | Weisberg et al. |
| 2006/0013532 A1 | 1/2006 | Wan |
| 2006/0024001 A1 | 2/2006 | Kobayashi |
| 2006/0054606 A1 | 3/2006 | Amako |
| 2006/0067632 A1 | 3/2006 | Broeng et al. |
| 2006/0215976 A1 | 9/2006 | Singh et al. |
| 2006/0219673 A1 | 10/2006 | Varnham et al. |
| 2006/0275705 A1 | 12/2006 | Dorogy et al. |
| 2006/0291788 A1 | 12/2006 | Po |
| 2007/0026676 A1 | 2/2007 | Li et al. |
| 2007/0041083 A1 | 2/2007 | Di Teodoro et al. |
| 2007/0047940 A1 | 3/2007 | Matsumoto et al. |
| 2007/0075060 A1 | 4/2007 | Shedlov et al. |
| 2007/0104436 A1 | 5/2007 | Li et al. |

(56) References Cited

U.S. PATENT DOCUMENTS

| | | |
|---|---|---|
| 2007/0104438 A1 | 5/2007 | Varnham |
| 2007/0147751 A1 | 6/2007 | Fini |
| 2007/0178674 A1 | 8/2007 | Imai et al. |
| 2007/0195850 A1 | 8/2007 | Schluter et al. |
| 2007/0206900 A1 | 9/2007 | Po |
| 2007/0215820 A1 | 9/2007 | Cordingley et al. |
| 2007/0251543 A1 | 11/2007 | Singh |
| 2007/0280597 A1 | 12/2007 | Nakai et al. |
| 2008/0037604 A1 | 2/2008 | Savage-Leuchs |
| 2008/0141724 A1 | 6/2008 | Fuflyigin |
| 2008/0154249 A1 | 6/2008 | Cao |
| 2008/0181567 A1 | 7/2008 | Bookbinder et al. |
| 2008/0231939 A1 | 9/2008 | Gluckstad |
| 2008/0246024 A1 | 10/2008 | Touwslager et al. |
| 2008/0251504 A1 | 10/2008 | Lu et al. |
| 2009/0034059 A1 | 2/2009 | Fini |
| 2009/0052849 A1 | 2/2009 | Lee et al. |
| 2009/0059353 A1 | 3/2009 | Fini |
| 2009/0080472 A1 | 3/2009 | Yao et al. |
| 2009/0080835 A1 | 3/2009 | Frith |
| 2009/0122377 A1 | 5/2009 | Wagner |
| 2009/0127477 A1 | 5/2009 | Tanaka et al. |
| 2009/0129237 A1 | 5/2009 | Chen et al. |
| 2009/0152247 A1 | 6/2009 | Jennings et al. |
| 2009/0154512 A1 | 6/2009 | Simons et al. |
| 2009/0175301 A1 | 7/2009 | Li et al. |
| 2009/0202191 A1 | 8/2009 | Ramachandran |
| 2009/0257621 A1 | 10/2009 | Silver |
| 2009/0274833 A1 | 11/2009 | Li |
| 2009/0297108 A1 | 12/2009 | Ushiwata et al. |
| 2009/0297140 A1 | 12/2009 | Heismann et al. |
| 2009/0314752 A1 | 12/2009 | Manens et al. |
| 2009/0324233 A1 | 12/2009 | Samartsev et al. |
| 2010/0025387 A1 | 2/2010 | Arai et al. |
| 2010/0067013 A1 | 3/2010 | Howieson et al. |
| 2010/0067555 A1 | 3/2010 | Austin et al. |
| 2010/0067860 A1 | 3/2010 | Ikeda et al. |
| 2010/0116794 A1 | 5/2010 | Taido et al. |
| 2010/0129029 A1 | 5/2010 | Westbrook |
| 2010/0150186 A1 | 6/2010 | Mizuuchi |
| 2010/0150201 A1 | 6/2010 | Shin et al. |
| 2010/0163537 A1 | 7/2010 | Furuta et al. |
| 2010/0187409 A1 | 7/2010 | Cristiani et al. |
| 2010/0225974 A1 | 9/2010 | Sandstrom |
| 2010/0230665 A1 | 9/2010 | Verschuren et al. |
| 2010/0251437 A1 | 9/2010 | Heyn et al. |
| 2010/0252543 A1 | 10/2010 | Manens et al. |
| 2010/0303419 A1 | 12/2010 | Benjamin et al. |
| 2010/0326969 A1 | 12/2010 | Tsukamoto et al. |
| 2011/0032602 A1 | 2/2011 | Rothenberg |
| 2011/0058250 A1 | 3/2011 | Liu et al. |
| 2011/0080476 A1 | 4/2011 | Dinauer et al. |
| 2011/0091155 A1 | 4/2011 | Yilmaz et al. |
| 2011/0127697 A1* | 6/2011 | Milne ............... G02B 27/0938 359/698 |
| 2011/0133365 A1 | 6/2011 | Ushimaru et al. |
| 2011/0134512 A1 | 6/2011 | Ahn et al. |
| 2011/0163077 A1 | 7/2011 | Partlo et al. |
| 2011/0187025 A1 | 8/2011 | Costin, Sr. |
| 2011/0243161 A1 | 10/2011 | Tucker et al. |
| 2011/0248005 A1 | 10/2011 | Briand et al. |
| 2011/0249940 A1 | 10/2011 | Sasaoka et al. |
| 2011/0253668 A1 | 10/2011 | Winoto et al. |
| 2011/0278277 A1 | 11/2011 | Stork Genannt Wersborg |
| 2011/0279826 A1 | 11/2011 | Miura et al. |
| 2011/0297229 A1 | 12/2011 | Gu et al. |
| 2011/0305249 A1 | 12/2011 | Gapontsev et al. |
| 2011/0305256 A1 | 12/2011 | Chann |
| 2011/0316029 A1 | 12/2011 | Maruyama et al. |
| 2012/0002919 A1 | 1/2012 | Liu |
| 2012/0009511 A1 | 1/2012 | Dmitriev |
| 2012/0051084 A1 | 3/2012 | Yalin et al. |
| 2012/0051692 A1 | 3/2012 | Seo |
| 2012/0082410 A1 | 4/2012 | Peng et al. |
| 2012/0093461 A1 | 4/2012 | Ramachandran |
| 2012/0127097 A1 | 5/2012 | Gaynor et al. |
| 2012/0128294 A1 | 5/2012 | Voss et al. |
| 2012/0145685 A1 | 6/2012 | Ream et al. |
| 2012/0148823 A1 | 6/2012 | Chu |
| 2012/0156458 A1 | 6/2012 | Chu |
| 2012/0168411 A1 | 7/2012 | Farmer et al. |
| 2012/0219026 A1 | 8/2012 | Saracco et al. |
| 2012/0262781 A1 | 10/2012 | Price et al. |
| 2012/0267345 A1 | 10/2012 | Clark et al. |
| 2012/0295071 A1 | 11/2012 | Sato |
| 2012/0301733 A1 | 11/2012 | Eckert et al. |
| 2012/0301737 A1 | 11/2012 | Labelle et al. |
| 2012/0321262 A1 | 12/2012 | Goell et al. |
| 2012/0329974 A1 | 12/2012 | Inada et al. |
| 2013/0005139 A1 | 1/2013 | Krasnov et al. |
| 2013/0022754 A1 | 1/2013 | Bennett et al. |
| 2013/0023086 A1 | 1/2013 | Chikama et al. |
| 2013/0027648 A1 | 1/2013 | Moriwaki |
| 2013/0028276 A1 | 1/2013 | Minelly et al. |
| 2013/0038923 A1 | 2/2013 | Jespersen et al. |
| 2013/0044768 A1 | 2/2013 | Ter-Mikirtychev |
| 2013/0087694 A1 | 4/2013 | Creeden et al. |
| 2013/0095260 A1* | 4/2013 | Bovatsek ............... B29C 66/939 65/102 |
| 2013/0134637 A1 | 5/2013 | Wiesner et al. |
| 2013/0146569 A1 | 6/2013 | Woods et al. |
| 2013/0148925 A1 | 6/2013 | Muendel et al. |
| 2013/0186871 A1 | 7/2013 | Suzuki et al. |
| 2013/0223792 A1 | 8/2013 | Huber et al. |
| 2013/0228442 A1 | 9/2013 | Mohaptatra et al. |
| 2013/0251324 A1 | 9/2013 | Fini et al. |
| 2013/0272657 A1 | 10/2013 | Salokatve |
| 2013/0294728 A1 | 11/2013 | Rockwell |
| 2013/0299468 A1 | 11/2013 | Unrath et al. |
| 2013/0301300 A1 | 11/2013 | Duerksen et al. |
| 2013/0308661 A1 | 11/2013 | Nishimura et al. |
| 2013/0343703 A1 | 12/2013 | Genier |
| 2014/0044143 A1 | 2/2014 | Clarkson et al. |
| 2014/0086526 A1 | 3/2014 | Starodubov et al. |
| 2014/0104618 A1 | 4/2014 | Potsaid et al. |
| 2014/0155873 A1 | 6/2014 | Bor |
| 2014/0177038 A1 | 6/2014 | Rrataj et al. |
| 2014/0178023 A1 | 6/2014 | Oh et al. |
| 2014/0205236 A1 | 7/2014 | Noguchi et al. |
| 2014/0233900 A1 | 8/2014 | Hugonnot et al. |
| 2014/0241385 A1 | 8/2014 | Fomin et al. |
| 2014/0259589 A1 | 9/2014 | Xu et al. |
| 2014/0263209 A1 | 9/2014 | Burris et al. |
| 2014/0268310 A1 | 9/2014 | Ye et al. |
| 2014/0313513 A1 | 10/2014 | Liao |
| 2014/0319381 A1* | 10/2014 | Gross ............... H01L 31/1884 250/492.1 |
| 2014/0332254 A1 | 11/2014 | Pellerite et al. |
| 2014/0333931 A1 | 11/2014 | Lu et al. |
| 2014/0334788 A1 | 11/2014 | Fini et al. |
| 2015/0049987 A1 | 2/2015 | Grasso et al. |
| 2015/0086159 A1 | 3/2015 | Salokatve et al. |
| 2015/0096963 A1* | 4/2015 | Bruck ............... B23K 26/342 219/121.61 |
| 2015/0104139 A1 | 4/2015 | Brunet et al. |
| 2015/0125114 A1 | 5/2015 | Genier |
| 2015/0125115 A1 | 5/2015 | Genier |
| 2015/0138630 A1 | 5/2015 | Honea et al. |
| 2015/0165556 A1 | 6/2015 | Jones et al. |
| 2015/0217402 A1 | 8/2015 | Hesse et al. |
| 2015/0241632 A1 | 8/2015 | Chann et al. |
| 2015/0283613 A1 | 10/2015 | Backlund et al. |
| 2015/0293300 A1 | 10/2015 | Fini et al. |
| 2015/0293306 A1 | 10/2015 | Huber et al. |
| 2015/0314612 A1 | 11/2015 | Balasini et al. |
| 2015/0316716 A1 | 11/2015 | Fini et al. |
| 2015/0325977 A1 | 11/2015 | Gu et al. |
| 2015/0331205 A1 | 11/2015 | Tayebati et al. |
| 2015/0349481 A1 | 12/2015 | Kliner |
| 2015/0352664 A1 | 12/2015 | Errico et al. |
| 2015/0372445 A1 | 12/2015 | Harter |
| 2015/0378184 A1 | 12/2015 | Tayebati et al. |
| 2016/0013607 A1 | 1/2016 | McComb et al. |
| 2016/0052162 A1 | 2/2016 | Colin et al. |

(56) References Cited

U.S. PATENT DOCUMENTS

| | | | |
|---|---|---|---|
| 2016/0097903 A1 | 4/2016 | Li et al. | |
| 2016/0104995 A1 | 4/2016 | Savage-Leuchs | |
| 2016/0111851 A1 | 4/2016 | Kliner et al. | |
| 2016/0114431 A1 | 4/2016 | Cheverton et al. | |
| 2016/0116679 A1 | 4/2016 | Muendel et al. | |
| 2016/0158889 A1 | 6/2016 | Carter et al. | |
| 2016/0175935 A1 | 6/2016 | Ladewig et al. | |
| 2016/0179064 A1 | 6/2016 | Arthur et al. | |
| 2016/0187646 A1 | 6/2016 | Ehrmann | |
| 2016/0196072 A1 | 7/2016 | Smith | |
| 2016/0207111 A1 | 7/2016 | Robrecht et al. | |
| 2016/0218476 A1 | 7/2016 | Kliner et al. | |
| 2016/0285227 A1 | 9/2016 | Farrow et al. | |
| 2016/0294150 A1 | 10/2016 | Johnson | |
| 2016/0320565 A1 | 11/2016 | Brown et al. | |
| 2016/0320685 A1 | 11/2016 | Tayebati et al. | |
| 2016/0369332 A1 | 12/2016 | Rothberg et al. | |
| 2017/0003461 A1 | 1/2017 | Tayebati et al. | |
| 2017/0036299 A1 | 2/2017 | Goya et al. | |
| 2017/0090119 A1 | 3/2017 | Logan et al. | |
| 2017/0090462 A1 | 3/2017 | Dave et al. | |
| 2017/0110845 A1 | 4/2017 | Hou et al. | |
| 2017/0120537 A1 | 5/2017 | DeMuth et al. | |
| 2017/0162999 A1 | 6/2017 | Saracco et al. | |
| 2017/0271837 A1 | 9/2017 | Hemenway et al. | |
| 2017/0293084 A1 | 10/2017 | Zhou et al. | |
| 2017/0320168 A1* | 11/2017 | Martinsen | B22F 12/90 |
| 2017/0336580 A1 | 11/2017 | Tayebati et al. | |
| 2017/0363810 A1 | 12/2017 | Holland et al. | |
| 2018/0059343 A1 | 3/2018 | Kliner | |
| 2018/0154484 A1 | 6/2018 | Hall | |
| 2018/0193956 A1 | 7/2018 | Ostroverkhov et al. | |
| 2018/0203185 A1 | 7/2018 | Farrow et al. | |
| 2019/0217422 A1 | 7/2019 | Kramer et al. | |
| 2019/0250398 A1 | 8/2019 | Small et al. | |
| 2019/0258091 A1 | 8/2019 | Kliner et al. | |
| 2019/0270161 A1 | 9/2019 | Allenberg-Rabe et al. | |
| 2020/0251237 A1 | 8/2020 | Gross | |
| 2020/0263978 A1 | 8/2020 | Pieger et al. | |
| 2020/0333640 A1 | 10/2020 | Kliner et al. | |
| 2023/0028351 A1 | 1/2023 | Errico et al. | |

FOREIGN PATENT DOCUMENTS

| | | |
|---|---|---|
| CA | 2637535 | 8/2007 |
| CN | 1212056 | 3/1999 |
| CN | 1445600 | 10/2003 |
| CN | 1217030 C | 8/2005 |
| CN | 1926460 | 3/2007 |
| CN | 1966224 | 5/2007 |
| CN | 101836309 | 10/2007 |
| CN | 101071926 | 11/2007 |
| CN | 101133351 A | 2/2008 |
| CN | 101143405 | 3/2008 |
| CN | 101303269 | 11/2008 |
| CN | 101314196 | 12/2008 |
| CN | 101403822 | 4/2009 |
| CN | 101733561 | 6/2010 |
| CN | 101821081 | 9/2010 |
| CN | 101836309 | 9/2010 |
| CN | 201783759 | 4/2011 |
| CN | 102084282 | 6/2011 |
| CN | 102176104 | 9/2011 |
| CN | 102207618 | 10/2011 |
| CN | 102289072 | 12/2011 |
| CN | 102301200 | 12/2011 |
| CN | 102441740 | 5/2012 |
| CN | 102448623 | 5/2012 |
| CN | 102481664 | 5/2012 |
| CN | 102640026 | 8/2012 |
| CN | 103173760 | 6/2013 |
| CN | 103521920 | 1/2014 |
| CN | 104169763 | 11/2014 |
| CN | 104475970 | 4/2015 |
| CN | 104704821 | 6/2015 |
| CN | 104759623 | 7/2015 |
| CN | 104979748 | 10/2015 |
| CN | 104999670 | 10/2015 |
| CN | 105163894 | 12/2015 |
| CN | 105290610 | 2/2016 |
| CN | 105365215 | 3/2016 |
| CN | 105383060 | 3/2016 |
| CN | 105682900 | 6/2016 |
| CN | 105965015 | 9/2016 |
| CN | 106163703 | 11/2016 |
| CN | 106163774 | 11/2016 |
| CN | 106180712 | 12/2016 |
| CN | 106312567 | 1/2017 |
| CN | 206010148 | 3/2017 |
| CN | 106660123 | 5/2017 |
| DE | 4200587 | 4/1993 |
| DE | 4437284 | 4/1996 |
| DE | 203 20 269 | 4/2004 |
| DE | 10321102 | 12/2004 |
| DE | 60312826 | 1/2008 |
| DE | 102013205029 | 9/2014 |
| DE | 102013215362 | 2/2015 |
| DE | 102013017792 | 4/2015 |
| DE | 102015202347 | 8/2016 |
| DE | 202016004237 | 8/2016 |
| DE | 102015103127 | 9/2016 |
| EP | 0048855 | 5/1982 |
| EP | 0366856 | 5/1990 |
| EP | 0731743 | 9/1996 |
| EP | 0731743 | 4/1998 |
| EP | 1238745 | 9/2002 |
| EP | 1340583 | 9/2003 |
| EP | 1800700 | 6/2007 |
| EP | 1974848 | 10/2008 |
| EP | 1266259 | 5/2011 |
| EP | 2514553 | 10/2012 |
| EP | 2587564 | 5/2013 |
| EP | 2642246 | 9/2013 |
| EP | 2886226 | 6/2015 |
| JP | 60046892 | 3/1985 |
| JP | H02220314 | 9/1990 |
| JP | H06-297168 | 10/1994 |
| JP | 10282450 | 10/1998 |
| JP | H11780 | 1/1999 |
| JP | H11-231138 | 8/1999 |
| JP | H11-287922 | 10/1999 |
| JP | H11-344636 | 12/1999 |
| JP | 2003-129862 | 5/2003 |
| JP | 2003200286 | 7/2003 |
| JP | 2004291031 | 10/2004 |
| JP | 2005-070608 | 3/2005 |
| JP | 2005-203430 | 7/2005 |
| JP | 2006-45584 | 2/2006 |
| JP | 2006-098085 | 4/2006 |
| JP | 2006-106227 | 4/2006 |
| JP | 2006-285234 | 10/2006 |
| JP | 2007-518566 | 7/2007 |
| JP | 4112355 | 7/2008 |
| JP | 2008-281395 | 11/2008 |
| JP | 2009-142866 | 7/2009 |
| JP | 2009-193070 | 8/2009 |
| JP | 2009-248157 | 10/2009 |
| JP | 2012-059920 | 3/2012 |
| JP | 2012-528011 | 11/2012 |
| JP | 2015-500571 | 1/2015 |
| JP | 2015-196265 | 11/2015 |
| JP | 2016-046132 | 4/2016 |
| JP | 2016-201558 | 12/2016 |
| KR | 10-2011-0109957 | 10/2011 |
| RU | 2008742 | 2/1994 |
| RU | 2021881 | 10/1994 |
| RU | 2365476 | 8/2009 |
| RU | 2528287 | 9/2014 |
| TW | 504425 | 10/2002 |
| TW | 553430 | 9/2003 |
| TW | 200633062 | 9/2006 |
| TW | I271904 | 1/2007 |
| TW | 200707466 | 2/2007 |
| TW | 201307949 | 2/2013 |

(56) References Cited

FOREIGN PATENT DOCUMENTS

| WO | WO 1995/011100 | 4/1995 |
|---|---|---|
| WO | WO 1995/011101 | 4/1995 |
| WO | WO 01/74529 | 10/2001 |
| WO | WO 2004/027477 | 4/2004 |
| WO | WO 2005/053895 A1 | 6/2005 |
| WO | WO 2008/053915 | 5/2008 |
| WO | WO 2010/029243 | 3/2010 |
| WO | WO 2011/124671 | 10/2011 |
| WO | WO 2012/088361 | 6/2012 |
| WO | WO 2012/102655 | 8/2012 |
| WO | WO 2012/165389 | 12/2012 |
| WO | WO 2013/086227 | 6/2013 |
| WO | WO 2013/090236 | 6/2013 |
| WO | WO 2014/074947 | 5/2014 |
| WO | WO 2014/154901 | 10/2014 |
| WO | WO 2014/179345 | 11/2014 |
| WO | WO 2015/146591 | 10/2015 |
| WO | WO 2015/189883 | 12/2015 |
| WO | WO 2016/059938 | 4/2016 |
| WO | WO 2016/085334 | 6/2016 |
| WO | WO 2016/156824 | 10/2016 |
| WO | WO 2017/008022 | 1/2017 |
| WO | WO 2017/015241 | 1/2017 |
| WO | WO 2017/136831 | 8/2017 |

OTHER PUBLICATIONS

Adelman et al., "Measurement of Relative State-to-State Rate Constants for the Reaction D + H$_2$(v', j') →HD(v', j') + H," *J. Chem. Phys.*, 97:7323-7341 (Nov. 15, 1992).

Affine Transformation—from Wolfram MathWorld, http://mathworld.wolfram.com/AffineTransformation.html, downloaded Feb. 21, 2014, 2 pages.

Alfano et al., "Photodissociation and Recombination Dynamics of I$_2^{-in\ Solution}$," *Ultrafast Phenomena VIII*, (Springer-Verlag, New York), pp. 653-655 (Jan. 1993).

AlMangour et al., "Scanning strategies for texture and anisotropy tailoring during selective laser melting of TiC/316L stainless steel nanocomposites," *Journal of Alloys and Compounds*, 728:424-435 (Aug. 5, 2017).

"ARM," Coherent, available at: http://www.corelase.fi/products/arm/, 6 pages, retrieved May 26, 2017.

Ayoola, "Study of Fundamental Laser Material Interaction Parameters in Solid and Powder Melting," Ph.D. Thesis, Cranfield University, 192 pages (May 2016).

Bai et al., "Effect of Bimodal Powder Mixture on Powder Packing Density and Sintered Density in Binder Jetting of Metals," 26th Annual International Solid Freeform Fabrication Symposium, 14 pages (Aug. 10-12, 2015).

Bergmann et al., "Effects of diode laser superposition on pulsed laser welding of aluminum," *Physics Procedia*, 41:180-189 (2013).

Bernasconi et al., "Kinetics of Ionization of Nitromethane and Phenylnitromethane by Amines and Carboxylate Ions in Me$_2$SO-Water Mixtures. Evidence of Ammonium Ion-Nitronate Ion Hydrogen Bonded Complex Formation in Me$_2$SO-Rich Solvent Mixtures," *J. Org. Chem.*, 53:3342-3351 (Jul. 1988).

Bertoli et al., "On the limitations of Volumetric Energy Density as a design parameter for Selective Laser Melting," *Materials and Design*, 113:331-340 (Oct. 19, 2016).

Blake et al., "The H + D$_2$ Reaction: HD(v=1, J) and HD(v=2, J) Distributions at a Collision Energy of 1.3 eV," *Chem. Phys. Lett.*, 153:365-370 (Dec. 23, 1988).

Brown et al., "Fundamentals of Laser-Material Interaction and Application to Multiscale Surface Modification," Chapter 4, Laser Precision Microfabrication, pp. 91-120 (2010).

Burger et al., "Implementation of a spatial light modulator for intracavity beam shaping," *J. Opt.*, 17:1-7, (2015).

"Business Unit Laser Ablation and Cutting: Laser Beam Fusion Cutting with Dynamic Beam Shaping," Fraunhofer IWS Annual Report 2015, pp. 86-87 (2015).

"Canunda, Application Note," CAILabs, available at: www.cailabs.com, 16 pages (Jun. 10, 2015).

"Canunda, Application Note: Flexible high-power laser beam shaping," CAILabs, available at: www.cailabs.com, 22 pages, date unknown (cited by the Examiner in a related U.S. Appl. No. 15/607,399).

Caprio, "Investigation of emission modes in the SLM of AISI 316L: modelling and process diagnosis," Ph.D. Thesis, Polytechnic University of Milan, 3 pages (Apr. 28, 2017).—Abstract only.

Chen et al., "An Algorithm for correction of Distortion of Laser marking Systems," IEEE International Conference on Control and Automation, Guangzhou, China, 5 pages (May 30-Jun. 1, 2007).

Chen et al., "An On-Machine Error Calibration Method for a Laser Micromachining Tool," Precision Engineering, 47:239-248 (Jan. 31, 2017).

Chen et al., "Improving additive manufacturing processability of hard-to-process overhanging structure by selective laser melting," *Journal of Materials Processing Tech.*, 250:99-108 (Jul. 1, 2017).

Chung, "Solution-Processed Flexible Transparent Conductors Composed of Silver Nanowire Networks Embedded in Indium Tin Oxide Nanoparticle Matrices," Nano Research, 10 pages (Sep. 24, 2012).

Cloots et al., "Investigations on the microstructure and crack formation of IN738LC samples processed by selective laser melting using Gaussian and doughnut profiles," *Materials and Design*, 89:770-784 (2016).

Daniel et al., "Novel technique for mode selection in a large-mode-area fiber laser," Conference on Lasers and Electro-Optics 2010, OSA Technical Digest (CD) (Optical Society of America), paper CWC5, 2 pages (Jan. 2010).

Daniel et al., "Novel technique for mode selection in a multimode fiber laser," *Optics Express*, 19:12434-12439 (Jun. 20, 2011).

DebRoy et al., "Additive manufacturing of metallic components—Process, structure and properties," *Progress in Materials Science*, 92:112-224 (2018).

Dehoff et al., "Site specific control of crystallographic grain orientation through electron beam additive manufacturing," *Materials Science and Technology*, 31:931-938 (2015).

Demir et al., "From pulsed to continuous wave emission in SLM with contemporary fiber laser sources: effect of temporal and spatial pulse overlap in part quality," *Int. J. Adv. Manuf. Technol.*, 91:2701-2714 (Jan. 10, 2017).

Dezfoli et al., "Determination and controlling of grain structure of metals after laser incidence: Theoretical approach," *Scientific Reports*, 7:1-11 (Jan. 30, 2017).

Di Teodoro et al., "Diffraction-Limited, 300-kW Peak-Power Pulses from a Coiled Multimode Fiber Amplifier," *Optics Letters*, 27:518-520 (May 2002).

Di Teodoro et al., "Diffraction-limited, 300-kW-peak-power Pulses from a Yb-doped Fiber Amplifier," Conference on Lasers and Electro-Optics, OSA Technical Digest (Optical Society of America, Washington, DC), p. 592-593 (May 22-24, 2002).

Di Teodoro et al., "High-peak-power pulsed fiber sources," *Proc. of SPIE*, 5448:561-571 (Sep. 20, 2004).

Dorrington et al., "A simple microcontroller based digital lock-in amplifier for the detection of low level optical signals," Proceedings of the First IEEE International Workshop on Electronic Design, Test and Applications (DELTA '02), 3 pages (2002).

Duocastella et al., "Bessel and annular beams for materials processing," *Laser Photonics Rev.* 6, pp. 607-621 (2012).

"Efficient and Simple Precision, Laser Processing Head PDT-B," HIGHYAG, 6 pages, (Jan. 2010).

Eichenholz, "Photonic-crystal fibers have many uses," Optoelectronics World, 4 pages (Aug. 2004).

"ENSIS Series," Amada America, Inc., available at: http://www.amada.com/america/ensis-3015-aj, 2 pages, retrieved May 26, 2017.

"EX-F Series," MC Machinery Systems, Inc., available at: https://www.mcmachinery.com/products-and-solutions/ex-f-series/, 2 pages, retrieved May 26, 2017.

Faidel et al., "Improvement of selective laser melting by beam shaping and minimized thermally induced effects in optical systems," 9th International Conference on Photonic Technologies LANE 2016, pp. 1-4 (2016).

(56) References Cited

OTHER PUBLICATIONS

Farrow et al., "Bend-Loss Filtered, Large-Mode-Area Fiber Amplifiers: Experiments and Modeling," Proceedings of the Solid State and Diode Laser Technology Review (Directed Energy Professional Society), P-9, 5 pages (2006).
Farrow et al., "Compact Fiber Lasers for Efficient High-Power Generation," Proc. of SPIE, 6287:62870C-1-62870C-6 (Sep. 1, 2006).
Farrow et al., "Design of Refractive-Index and Rare-Earth-Dopant Distributions for Large-Mode-Area Fibers Used in Coiled High-Power Amplifiers," Proc. of SPIE, 6453:64531C-1-64531C-11 (Feb. 22, 2007).
Farrow et al., "High-Peak-Power (>1.2 MW) Pulsed Fiber Amplifier," Proc. of the SPIE, 6102:61020L-1-61020L-11 (Mar. 2006).
Farrow et al., "Numerical Modeling of Self-Focusing Beams in Fiber Amplifiers," Proc. of the SPIE, 6453:645309-1-645309-9 (2007).
Farrow et al., "Peak-Power Limits on Fiber Amplifiers Imposed by Self-Focusing," Optics Lett., 31:3423-3425 (Dec. 1, 2006).
Fève et al., "Four-wave mixing in nanosecond pulsed fiber amplifiers," Optics Express, 15:4647-4662 (Apr. 16, 2007).
Fève et al., "Limiting Effects of Four-Wave Mixing in High-Power Pulsed Fiber Amplifiers," Proc. of the SPIE, 6453:64531P-1-64531P-11 (Feb. 22, 2007).
Fey, "3D Printing and International Security," PRIF Report No. 144, 47 pages (2017).
Fini, "Bend-compensated design of large-mode-area fibers," Optics Letters, 31:1963-1965 (Jul. 1, 2006).
Fini, "Large mode area fibers with asymmetric bend compensation," Optics Express, 19:21866-21873 (Oct. 24, 2011).
Fini et al., "Bend-compensated large-mode-area fibers: achieving robust single-modedness with transformation optics," Optics Express, 21:19173-19179 (Aug. 12, 2013).
Florentin et al., "Shaping the light amplified in a multimode fiber," Official Journal of the CIOMP, Light: Science & Applications, 6:1-9 (Feb. 24, 2017).
Fox et al., "Effect of low-earth orbit space on radiation-induced absorption in rare-earth-doped optical fibers," J. Non-Cryst. Solids, 378:79-88 (Oct. 15, 2013).
Fox et al., "Gamma Radiation Effects in Yb-Doped Optical Fiber," Proc, of the SPIE, 6453:645328-1-645328-9 (Feb. 23, 2007).
Fox et al., "Gamma-Radiation-Induced Photodarkening in Unpumped Optical Fibers Doped with Rare-Earth Constituents," IEEE Trans. on Nuclear Science, 57:1618-1625 (Jun. 2010).
Fox et al., "Investigation of radiation-induced photodarkening in passive erbium-, ytterbium-, and Yb/Er co-doped optical fibers," Proc. of the SPIE, 6713:67130R-1-67130R-9 (Sep. 26, 2007).
Fox et al., "Radiation damage effects in doped fiber materials," Proc. of the SPIE, 6873:68731F-1-68731F-9 (Feb. 22, 2008).
Fox et al., "Spectrally Resolved Transmission Loss in Gamma Irradiated Yb-Doped Optical Fibers," IEEE J. Quant. Electron., 44:581-586 (Jun. 2008).
Fox et al., "Temperature and Dose-Rate Effects in Gamma Irradiated Rare-Earth Doped Fibers," Proc. of SPIE, 7095:70950B-1-70950B-8 (Aug. 26, 2008).
Francis, "The Effects of Laser and Electron Beam Spot Size in Additive Manufacturing Processes," Ph.D. Thesis, Carnegie Mellon University, 191 pages (May 2017).
Fuchs et al., "Beam shaping concepts with aspheric surfaces," Proc. of SPIE, 9581:95810L-1-95810L-7 (Aug. 25, 2015).
Fuse, "Beam Shaping for Advanced Laser Materials Processing," Laser Technik Journal, pp. 19-22 (Feb. 2015).
Garcia et al., "Fast adaptive laser shaping based on multiple laser incoherent combining," Proc. of SPIE, 10097:1009705-1-1009705-15 (Feb. 22, 2017).
Gardner, "Precision Photolithography on Flexible Substrates," http://azorescorp.com/downloads/Articles/AZORESFlexSubstrate.pdf (prior to. Jan. 30, 2013).

Ghasemi et al., "Beam shaping design for coupling high power diode laser stack to fiber," Applied Optics, 50:2927-2930 (Jun. 20, 2011).
Ghatak et al., "Design of Waveguide Refractive Index Profile to Obtain Flat Model Field," SPIE, 3666:40-44 (Apr. 1999).
Ghouse et al., "The influence of laser parameters and scanning strategies on the mechanical properties of a stochastic porous material," Materials and Design, 131:498-508 (2017).
Giannini et al., "Anticipating, measuring, and minimizing MEMS mirror scan error to improve laser scanning microscopy's speed and accuracy," PLOS ONE, 14 pages (Oct. 3, 2017).
Gissibl et al., "Sub-micrometre accurate free-form optics by three-dimensional printing on single-mode fibres," Nature Communications, 7:1-9 (Jun. 24, 2016).
Gockel et al., "Integrated melt pool and microstructure control for Ti-6A1-4V thin wall additive manufacturing," Materials Science and Technology, 31:912-916 (Nov. 3, 2014).
Goers et al., "Development of a Compact Gas Imaging Sensor Employing cw Fiber-Amp-Pumped PPLN OPO," Conference on Lasers and Electro-Optics, OSA Technical Digest (Optical Society of America, Washington, DC), p. 521 (May 11, 2001).
Goldberg et al., "Deep UV Generation by Frequency Tripling and Quadrupling of a High-Power Modelocked Semiconductor Laser," Proceedings of the Quantum Electronics and Laser Science Conference, QPD18-2 (Baltimore) 2 pages (May 1995).
Goldberg et al., "Deep UV Generation by Frequency Quadrupling of a High-Power GaAlAs Semiconductor Laser," Optics Lett., 20:1145-1147 (May 15, 1995).
Goldberg et al., "High Efficiency 3 W Side-Pumped Yb Fiber Amplifier and Laser," Conference on Lasers and Electro-Optics, OSA Technical Digest (Optical Society of America, Washington, DC), p. 11-12 (May 24, 1999).
Goldberg et al., "Highly Efficient 4-W Yb-Doped Fiber Amplifier Pumped by a Broad-Stripe Laser Diode," Optics Lett., 24:673-675 (May 15, 1999).
Goldberg et al., "High-Power Superfluorescent Source with a Side-Pumped Yb-Doped Double-Cladding Fiber," Optics Letters, 23:1037-1039 (Jul. 1, 1998).
Goldberg et al., "Tunable UV Generation at 286 nm by Frequency Tripling of a High-Power Modelocked Semiconductor Laser," Optics Lett., 20:1640-1642 (Aug. 1, 1995).
Golub, "Laser Beam Splitting by Diffractive Optics," Optics and Photonics News, 6 pages (Feb. 2004).
Goppold et al., "Dynamic Beam Shaping Improves Laser Cutting of Thick Steel Plates," Industrial Photonics, 4:18-19 (Jul. 2017).
Grigoriyants et al., "Tekhnologicheskie protsessy lazernoy obrabotki," Moscow, izdatelstvo MGTU im. N.E. Baumana, p. 334 (2006).
Gunenthiram et al., "Analysis of laser-melt pool-powder bed interaction during the selective laser melting of a stainless steel," Journal of Laser Applications, 29:022303-1-022303-8 (May 2017).
Gupta, "A Review on Layer Formation Studies in Selective Laser Melting of Steel Powders and Thin Wall Parts Using Pulse Shaping," International Journal of Manufacturing and Material Processing, 3:9-15 (2017).
Hafner et al., "Tailored laser beam shaping for efficient and accurate microstructuring," Applied Physics A, 124:111-1-111-9 (Jan. 10, 2018).
Han et al., "Reshaping collimated laser beams with Gaussian profile to uniform profiles," Applied Optics, 22:3644-3647 (Nov. 15, 1983).
Han et al., "Selective laser melting of advanced Al—$Al_2O_3$, nanocomposites: Simulation, microstructure and mechanical properties," Materials Science & Engineering A, 698:162-173, (May 17, 2017).
Hansen et al., "Beam shaping to control of weldpool size in width and depth," Physics Procedia, 56:467-476 (2014).
Hauschild, "Application Specific Beam Profiles—New Surface and Thin-Film Refinement Processes using Beam Shaping Technologies," Proc. of SPIE, 10085:100850J-1-100850J-9 (Feb. 22, 2017).
Headrick et al., "Application of laser photofragmentation-resonance enhanced multiphoton ionization to ion mobility spectrometry," Applied Optics, 49:2204-2214 (Apr. 10, 2010).

(56) References Cited

OTHER PUBLICATIONS

Hebert, "Viewpoint: metallurgical aspects of powder bed metal additive manufacturing," *J. Mater. Sci.*, 51:1165-1175 (Nov. 18, 2015).
Heck, "Highly integrated optical phased arrays: photonic integrated circuits for optical beam shaping and beam steering," *Nanophotonics*, 6:93-107 (2017).
Heider et al., "Process Stabilization at welding Copper by Laser Power Modulation," Physics Procedia, 12:81-87 (2011).
Hemenway et al., "Advances in high-brightness fiber-coupled laser modules for pumping multi-kW CW fiber lasers," *Proceedings of SPIE*, 10086:1008605-1-1008605-7 (Feb. 22, 2017).
Hemenway et al., "High-brightness, fiber-coupled pump modules in fiber laser applications," *Proc. of SPIE*, 8961:89611V-1-89611V-12 (Mar. 7, 2014).
Hengesbach et al., "Brightness and average power as driver for advancements in diode lasers and their applications," *Proc. SPIE*, 9348, 18 pages (2015).
Herwig et al., "Possibilities of power modulation and dynamic beam shaping," Fraunhofer IWS presentation, 6 pages, retrieved on Mar. 16, 2018.
Hoops et al., "Detection of mercuric chloride by photofragment emission using a frequency-converted fiber amplifier," *Applied Optics*, 46:4008-4014 (Jul. 1, 2007).
Hotoleanu et al., "High Order Modes Suppression in Large Mode Area Active Fibers by Controlling the Radial Distribution of the Rare Earth Dopant," *Proc. of the SPIE*, 6102:61021T-1-61021T-8 (Feb. 23, 2006).
"How to Select a Beamsplitter," IDEX—Optics & Photonics Marketplace, available at: https://www.cvilaseroptics.com/file/general/beamSplitters.pdf, 5 pages (Jan. 8, 2014).
Huang et al., "3D printing optical engine for controlling material microstructure," *Physics Procedia*, 83:847-853 (2016).
Huang et al., "All-fiber mode-group-selective photonic lantern using graded-index multimode fibers," *Optics Express*, 23:224-234 (Jan. 6, 2015).
Huang et al., "Double-cutting beam shaping technique for high-power diode laser area light source," *Optical Engineering*, 52:106108-1-106108-6 (Oct. 2013).
Injeyan et al., "Introduction to Optical Fiber Lasers," *High-Power Laser Handbook*, pp. 436-439 (2011).
Ishiguro et al., "High Efficiency 4-kW Fiber Laser Cutting Machine," *Rev. Laser Eng.*, 39:680-684 (May 21, 2011).
Jain et al., "Multi-element fiber technology for space-division multiplexing applications," *Optics Express*, 22:3787-3796 (Feb. 11, 2014).
Java—Transform a triangle to another triangle—Stack Overflow, http://stackoverflow.com/questions/1114257/transform-a-triangle-to-another-triangle?lq=1, downloaded Feb. 21, 2014, 3 pages.
Ji et al., "Meta-q-plate for complex beam shaping," *Scientific Reports*, 6:1-7 (May 6, 2016).
Jin et al., "Mode Coupling Effects in Ring-Core Fibers for Space-Division Multiplexing Systems," *Journal of Lightwave Technology*, 34:3365-3372 (Jul. 15, 2016).
Johnson et al., "Experimental and Theoretical Study of Inhomogeneous Electron Transfer in Betaine: Comparisons of Measured and Predicted Spectral Dynamics," *Chem. Phys.*, 176:555-574 (Oct. 15, 1993).
Johnson et al., "Ultrafast Experiments on the Role of Vibrational Modes in Electron Transfer," *Pure and Applied Chem.*, 64:1219-1224 (May 1992).
Kaden et al., "Selective laser melting of copper using ultrashort laser pulses," Lasers in Manufacturing Conference 2017, pp. 1-5 (2017).
Kaden et al., "Selective laser melting of copper using ultrashort laser pulses," *Applied Physics A*, 123:596-1-596-6 (Aug. 24, 2017).
Keicher et al., "Advanced 3D Printing of Metals and Electronics using Computational Fluid Dynamics," Solid Freeform Fabrication Symposium, 32 pages (Aug. 2015).

King et al., "Observation of keyhole-mode laser melting in laser powder-bed fusion additive manufacturing," *Journal of Materials Processing Technology*, 214:2915-2925 (2014).
Klerks et al., "Flexible beam shaping system for the next generation of process development in laser micromachining," 9th International Conference on Photonic Technologies LANE 2016, pp. 1-8 (2016).
Kliner, "Novel, High-Brightness, Fibre Laser Platform for kW Materials Processing Applications," 2015 European Conference on Lasers and Electro-Optics—European Quantum Electronics Conference (Optical Society of America, 2015), paper CJ_11_2, 1 page (Jun. 21-25, 2015).
Kliner et al., "4-kW fiber laser for metal cutting and welding," *Proc. of SPIE*, 7914:791418-791418-8 (Feb. 22, 2011).
Kliner et al., "Comparison of Experimental and Theoretical Absolute Rates for Intervalence Electron Transfer," *J. Am. Chem. Soc.*, 114:8323-8325 (Oct. 7, 1992).
Kliner et al., "Comparison of Experimental and Theoretical Integral Cross Sections for $D + H_2(v=1,j=1) \rightarrow HD(v'=1,j') + H$," *J. Chem. Phys.*, 95:1648-1662 (Aug. 1, 1991).
Kliner et al., "$D + H_2(v=1, J=1)$: Rovibronic State to Rovibronic State Reaction Dynamics," *J. Chem. Phys.*, 92:2107-2109 (Feb. 1, 1990).
Kliner et al., "Effect of Indistinguishable Nuclei on Product Rotational Distributions: $H + HI \rightarrow H_2 + I$ reaction$^{a)}$," *J. Chem. Phys.*, 90:4625-4327 (Apr. 15, 1989).
Kliner et al., "Efficient second, third, fourth, and fifth harmonic generation of a Yb-doped fiber amplifier," *Optics Communications*, 210:393-398 (Sep. 15, 2002).
Kliner et al., "Efficient UV and Visible Generation Using a Pulsed Yb-Doped Fiber Amplifier," *Conference on Lasers and Electro-Optics*, OSA Technical Digest (Optical Society of America, Washington, DC), p. CPDC10-1-CPDC10-3 (May 19-22, 2002).
Kliner et al., "Efficient visible and UV generation by frequency conversion of a mode-filtered fiber amplifier," *Proc. of SPIE*, 4974:230-235 (Jul. 3, 2003).
Kliner et al., "Fiber laser allows processing of highly reflective materials," *Industrial Laser Solutions*, 31:1-9 (Mar. 16, 2016).
Kliner et al., "High-Power Fiber Lasers," *Photonics & Imaging Technology*, pp. 2-5 (Mar. 2017).
Kliner et al., "Laboratory Investigation of the Catalytic Reduction Technique for Detection of Atmospheric $NO_y$," *J. Geophys. Res.*, 102:10759-10776 (May 20, 1997).
Kliner et al., "Laser Reflections: How fiber laser users are successfully processing highly reflective metals," Shop Floor Lasers, available at: http://www.shopfloorlasers.com/laser-cutting/fiber/354-laser-reflections, 9 pages (Jan./Feb. 2017).
Kliner et al., "Measurements of Ground-State OH Rotational Energy-Transfer Rates," *J. Chem. Phys.*, 110:412-422 (Jan. 1, 1999).
Kliner et al., "Mode-Filtered Fiber Amplifier," Sandia National Laboratories -Brochure, 44 pages (Sep. 13, 2007).
Kliner et al., "Narrow-Band, Tunable, Semiconductor-Laser-Based Source for Deep-UV Absorption Spectroscopy," *Optics Lett.*, 22:1418-1420 (Sep. 15, 1997).
Kliner et al., "Overview of Sandia's fiber laser program," *Proceedings of SPIE-The International Society for Optical Engineering*, 6952:695202-1-695202-12 (Apr. 14, 2008).
Kliner et al., "Photodissociation and Vibrational Relaxation of $I_2^-$ in Ethanol," *J. Chem. Phys.*, 98:5375-5389 (Apr. 1, 1993).
Kliner et al., "Photodissociation Dynamics of $I_2^-$ in Solution," *Ultrafast Reaction Dynamics and Solvent Effects*, (American Institute of Physics, New York), pp. 16-35 (Feb. 1994).
Kliner et al., "Polarization-Maintaining Amplifier Employing Double-Clad, Bow-Tie Fiber," *Optics Lett.*, 26:184-186 (Feb. 15, 2001).
Kliner et al., "Power Scaling of Diffraction-Limited Fiber Sources," *Proc. of SPIE*, 5647:550-556 (Feb. 21, 2005).
Kliner et al., "Power Scaling of Rare-Earth-Doped Fiber Sources," *Proc. of SPIE*, 5653:257-261 (Jan. 12, 2005).
Kliner et al., "Product Internal-State Distribution for the Reaction $H + HI \rightarrow H_2 + I$," *J. Chem. Phys.*, 95:1663-1670 (Aug. 1, 1991).
Kliner et al., "The $D + H_2$ Reaction: Comparison of Experiment with Quantum-Mechanical and Quasiclassical Calculations," *Chem. Phys. Lett.*, 166:107-111 (Feb. 16, 1990).

(56) References Cited

OTHER PUBLICATIONS

Kliner et al., "The H+para-$H_2$ reaction: Influence of dynamical resonances on $H_2$(v' = 1,j' = 1 and 3) Integral Cross Sections," *J. Chem. Phys.*, 94:1069-1080 (Jan. 15, 1991).
Koplow et al., A New Method for Side Pumping of Double-Clad Fiber Sources, *J. Quantum Electronics*, 39:529-540 (Apr. 4, 2003).
Koplow et al., "Compact 1-W Yb-Doped Double-Cladding Fiber Amplifier Using V-Groove Side-Pumping," *IEEE Photonics Technol. Lett.*, 10:793-795 (Jun. 1998).
Koplow et al., "Development of a Narrowband, Tunable, Frequency-Quadrupled Diode Laser for UV Absorption Spectroscopy," *Appl. Optics*, 37:3954-3960 (Jun. 20, 1998).
Koplow et al., "Diode-Bar Side-Pumping of Double-Clad Fibers," *Proc. of SPIE*, 5709:284-300 (Apr. 22, 2005).
Koplow et al., "High Power PM Fiber Amplifier and Broadband Source," *Optical Fiber Communication Conference*, OSA Technical Digest (Optical Society of America, Washington, DC), p. 12-13 (Mar. 7-10, 2000).
Koplow et al., "Polarization-Maintaining, Double-Clad Fiber Amplifier Employing Externally Applied Stress-Induced Birefringence," *Optics Lett.*, 25:387-389 (Mar. 15, 2000).
Koplow et al., "Single-mode operation of a coiled multimode fiber amplifier," *Optics Letters*, 25:442-444 (Apr. 1, 2000).
Koplow et al., Use of Bend Loss to Obtain Single-Transverse-Mode Operation of a Multimode Fiber Amplifier, *Conference on Lasers and Electro-Optics*, OSA Technical Digest (Optical Society of America, Washington, DC), p. 286-287 (May 7-12, 2000).
Koplow et al., "UV Generation by Frequency Quadrupling of a Yb-Doped Fiber Amplifier," *IEEE Photonics Technol. Lett.*, 10:75-77 (Jan. 1998).
Koponen et al., "Photodarkening Measurements in Large-Mode-Area Fibers," *Proc. of SPIE*, 6453:64531E-1-64531E-12 (Feb. 2007).
Kotlyar et al., "Asymmetric Bessel-Gauss beams," *J. Opt. Soc. Am. A*, 31:1977-1983 (Sep. 2014).
Kruth et al., "On-line monitoring and process control in selective laser melting and laser cutting," Proceedings of the 5th Lane Conference, laser Assisted Net Shape Engineering, vol. 1, 14 pages, (Sep. 1, 2007).
Kulp et al., "The application of quasi-phase-matched parametric light sources to practical infrared chemical sensing systems," *Appl. Phys. B*, 75:317-327 (Jun. 6, 2002).
Kummer et al., "Method to quantify accuracy of position feedback signals of a three-dimensional two-photon laser-scanning microscope," Biomedical Optics Express, 6(10):3678-3693 (Sep. 1, 2015).
"Laser cutting machines," TRUMPF, available at: http://www.us.trumpf.com/en/products/machine-tools/products/2d-laser-cutting/innovative-technology/brightline.html, 9 pages, retrieved May 26, 2017.
"Lasers & Fibers," NKT Photonics, available at: https://www.nktphotonics.com/lasers-fibers/technology/photonic-crystal-fibers/, 4 pages, retrieved Feb. 13, 2018.
Laskin et al., "Applying of refractive spatial beam shapers with scanning optics," ICALEO, Paper M604, pp. 941-947 (2011).
Lee et al., "FEM Simulations to Study the Effects of Laser Power and Scan Speed on Molten Pool Size in Additive Manufacturing," *International Journal of Mechanical and Mechatronics Engineering*, 11:1291-1295 (2017).
Li et al., "High-quality near-field beam achieved in a high-power laser based on SLM adaptive beam-shaping system," *Optics Express*, 23:681-689 (Jan. 12, 2015).
Li et al., "Melt-pool motion, temperature variation and dendritic morphology of Inconel 718 during pulsed-and continuous-wave laser additive manufacturing: A comparative study," *Materials and Design*, 119:351-360 (Jan. 23, 2017).
Litvin et al., "Beam shaping laser with controllable gain," *Appl. Phys. B*, 123:174-1-174-5 (May 24, 2017).
Liu et al., "Femtosecond laser additive manufacturing of YSZ," *Appl. Phys. A*, 123:293-1-293-8 (Apr. 1, 2017).

Longhi et al., "Self-focusing and nonlinear periodic beams in parabolic index optical fibres," *J. Opt. B: Quantum Semiclass. Opt.*, 6:S303-S308 (May 2004).
Maechling et al., "Sum Frequency Spectra in the C—H Stretch Region of Adsorbates on Iron," *Appl. Spectrosc.*, 47:167-172 (Feb. 1, 1993).
Malinauskas et al., "Ultrafast laser processing of materials: from science to industry," *Official Journal of the CIOMP, Light: Science & Applications*, 5:1-14 (2016).
Masoomi et al., "Quality part production via multi-laser additive manufacturing," *Manufacturing Letters*, 13:15-20 (May 27, 2017).
Matthews et al., "Diode-based additive manufacturing of metals using an optically-addressable light valve," *Optics Express*, 25:11788-11800 (May 15, 2017).
McComb et al., "Pulsed Yb:fiber system capable of >250 kW peak power with tunable pulses in the 50 ps to 1.5 ns range," *Proc. of SPIE*, 8601:86012T-1-86012T-11 (Mar. 22, 2013).
Meier et al., "Thermophysical Phenomena in Metal Additive Manufacturing by Selective Laser Melting: Fundamentals, Modeling, Simulation and Experimentation," available at: http://arxiv.org/pdf/1709.09510v1, pp. 1-59 (Sep. 4, 2017).
Moore et al., "Diode-bar side pumping of double-clad fibers," *Proc. of SPIE*, 6453:64530K-1-64530K-9 (Feb. 20, 2007).
Morales-Delgado et al., "Three-dimensional microfabrication through a multimode optical fiber," available at: http://arxiv.org, 20 pages (2016).
Morales-Delgado et al., "Three-dimensional microfabrication through a multimode optical fiber," *Optics Express*, 25:7031-7045 (Mar. 20, 2017).
Mumtaz et al., "Selective Laser Melting of thin wall parts using pulse shaping," *Journal of Materials Processing Technology*, 210:279-287 (2010).
Naidoo et al., "Improving the laser brightness of a commercial laser system," *Proc. of SPIE*, 10036:100360V-1-100360V-8 (Feb. 3, 2017).
Neuhauser et al., "State-to-State Rates for the D + $H_2$(v = 1, j = 1) → HD(v', j') + H Reaction: Predictions and Measurements," *Science*, 257:519-522 (Jul. 24, 1992).
Ngcobo et al., "A digital laser for on-demand laser modes," *Nature Communications*, 4:1-6 (Aug. 2, 2013).
Ngcobo et al., "The digital laser," available at: http://arxiv.org, pp. 1-9 (2013).
Okunkova et al., "Development of laser beam modulation assets for the process productivity improvement of selective laser melting," *Procedia IUTAM*, 23:177-186 (2017).
Okunkova et al., "Experimental approbation of selective laser melting of powders by the use of non-Gaussian power density distributions," *Physics Procedia*, 56:48-57 (2014). (2017).
Okunkova et al., "Study of laser beam modulation influence on structure of materials produced by additive manufacturing," *Adv. Mater. Lett.*, 7:111-115 (2016).
Olsen, "Laser metal cutting with tailored beam patterns," available at: https://www.industrial-lasers.com/articles/print/volume-26/issue-5/features/laser-metal-cutting-with-tailored-beam-patterns.html, 8 pages (Sep. 1, 2011).
PCI-6110, Multifunction I/O Device, http://www.ni.com/en-us-support/model.pci-6110.html, downloaded Dec. 15, 2017, 1 page.
Pinkerton, "Lasers in Additive Manufacturing," *Optics & Laser Technology*, 78:25-32 (2016).
Prashanth et al., "Is the energy density a reliable parameter for materials synthesis by selective laser melting?" *Mater. Res. Lett.*, 5:386-390 (2017).
Price et al., "High-brightness fiber-coupled pump laser development," *Proc. of SPIE*, 7583:758308-1-758308-7 (Feb. 2010).
Product Brochure entitled "3-Axis and High Power Scanning" by Cambridge Technology, 4 pages, downloaded Dec. 21, 2013.
Product Brochure supplement entitled "Theory of Operation" by Cambridge Technology, 2 pages, downloaded Dec. 21, 2013.
Purtonen, et al., "Monitoring and Adaptive Control of Laser Processes," Physics Procedia, Elsevier, Amsterdam, NL, 56(9):1218-1231 (Sep. 9, 2014).

(56) References Cited

OTHER PUBLICATIONS

Putsch et al., "Active optical system for advanced 3D surface structuring by laser remelting," *Proc. of SPIE*, 9356:93560U-1-93560U-10 (Mar. 9, 2015).
Putsch et al., "Active optical system for laser structuring of 3D surfaces by remelting," *Proc. of SPIE*, 8843:88430D-1-88430D-8 (Sep. 28, 2013).
Putsch et al., "Integrated optical design for highly dynamic laser beam shaping with membrane deformable mirrors," *Proc. of SPIE*, 10090:1009010-1-1009010-8 (Feb. 20, 2017).
Raghavan et al., "Localized melt-scan strategy for site specific control of grain size and primary dendrite arm spacing in electron beam additive manufacturing," *Acta Materialia*, 140:375-387 (Aug. 30, 2017).
Rashid et al., "Effect of scan strategy on density and metallurgical properties of 17-4PH parts printed by Selective Laser Melting (SLM)," *Journal of Materials Processing Tech.*, 249:502-511 (Jun. 19, 2017).
Rinnen et al., "Construction of a Shuttered Time-of-Flight Mass Spectrometer for Selective Ion Detection," *Rev. Sci. Instrum.*, 60:717-719 (Apr. 1989).
Rinnen et al., "Effect of Indistinguishable Nuclei on Product Rotational Distributions: $D + DI \rightarrow D_2 + I$," *Chem. Phys. Lett.*, 169:365-371 (Jun. 15, 1990).
Rinnen et al. "Quantitative Determination of HD Internal State Distributions via (2+1) REMPI," *Isr. J. Chem.*, 29:369-382 (Mar. 7, 1989).
Rinnen et al., "Quantitative determination of $H_2$, HD, and $D_2$ internal state distributions via (2+1) resonance-enhanced multiphoton ionization," *J. Chem. Phys.*, 95:214-225 (Jul. 1, 1991).
Rinnen et al., "The $H + D_2$ Reaction: "Prompt" HD Distributions at High Collision Energies," *Chem. Phys. Lett.*, 153:371-375 (Dec. 23, 1988).
Rinnen et al., "The $H + D_2$ Reaction: Quantum State Distributions at Collision Energies of 1.3 and 0.55 eV," *J. Chem. Phys.*, 91:7514-7529 (Dec. 15, 1989).
Roehling et al., "Modulating laser intensity profile ellipticity for microstructural control during metal additive manufacturing," *Acta Materialia*, 128:197-206 (2017).
Romero et al., "Lossless laser beam shaping," *J. Opt. Soc. Am. A*, 13:751-760 (Apr. 1996).
Rosales-Guzman et al., "Multiplexing 200 modes on a single digital hologram," available at: http://arxiv.org/pdf/1706.06129v1, pp. 1-14 (Jun. 19, 2017).
Russell, "Photonic-Crystal Fibers," *IEEE JLT*, 24:4729-4749 (Dec. 2006).
Saint-Pierre et al., "Fast uniform micro structuring of DLC surfaces using multiple ultrashort laser spots through spatial beam shaping," *Physics Procedia*, 83:1178-1183 (2016).
Saleh et al., "Chapter 9.4 Holey and Photonic-Crystal Fibers," *Fundamentals of Photonics, Second Edition*, pp. 359-362 (2007).
Sames et al., "The metallurgy and processing science of metal additive manufacturing," *International Materials Reviews*, pp. 1-46 (2016).
Sanchez-Rubio et al., "Wavelength Beam Combining for Power and Brightness Scaling of Laser Systems," *Lincoln Laboratory Journal*, 20:52-66 (2014).
Saracco et al., Compact, 17 W average power, 100 kW peak power, nanosecond fiber laser system, *Proc. of SPIE*, 8601:86012U-1-86012U-13 (Mar. 22, 2013).
Sateesh et al., "Effect of Process Parameters on Surface Roughness of Laser Processsed Inconel Superalloy," *International Journal of Scientific & Engineering Research*, 5:232-236 (Aug. 2014).
Schrader et al., "Fiber-Based Laser with Tunable Repetition Rate, Fixed Pulse Duration, and Multiple Wavelength Output," *Proc. of the SPIE*, 6453:64530D-1-64530D-9 (Feb. 20, 2007).
Schrader et al., "High-Power Fiber Amplifier with Widely Tunable Repetition Rate, Fixed Pulse Duration, and Multiple Output Wavelengths," *Optics Express*, 14:11528-11538 (Nov. 27, 2006).
Schrader et al., "Power scaling of fiber-based amplifiers seeded with microchip lasers," *Proc. of the SPIE*, 6871:68710T-1-68710T-11 (Feb. 2008).
Schulze et al., "Mode Coupling in Few-Mode Fibers Induced by Mechanical Stress," *Journal of Lightwave Technology*, 33:4488-4496 (Nov. 1, 2015).
SeGall et al., "Simultaneous laser mode conversion and beam combining using multiplexed volume phase elements," Advanced Solid-State Lasers Congress Technical Digest, Optical Society of America, paper AW2A.9, 3 pages (Oct. 27-Nov. 1, 2013).
Sheehan et al., "Faserlaser zur Bearbeitung hochreflektierender Materialien (Fiber laser processing of highly reflective materials)," *Laser*, 3:92-94 (Jun. 2017).
Sheehan et al. "High-brightness fiber laser advances remote laser processing," *Industrial Laser Solutions*, 31:1-9 (Nov. 2, 2016).
Shusteff et al., "One-step volumetric additive manufacturing of complex polymer structures," *Sci. Adv.*, 3:1-7 (Dec. 8, 2017).
Smith et al., "Tailoring the thermal conductivity of the powder bed in Electron Beam Melting (EBM) Additive Manufacturing," *Scientific Reports*, 7:1-8 (Sep. 5, 2017).
Spears et al., "In-process sensing in selective laser melting (SLM) additive manufacturing," *Integrating Materials and Manufacturing Innovation*, 5:2-25 (2016).
Sun et al., "Optical Surface Transformation: Changing the optical surface by homogeneous optic-null medium at will," *Scientific Reports*, 5:16032-1-16032-20 (Oct. 30, 2015).
Sundqvist et al., "Analytical heat conduction modelling for shaped laser beams," *Journal of Materials Processing Tech.*, 247:48-54 (Apr. 18, 2017).
Thiel et al., "Reliable Beam Positioning for Metal-based Additive Manufacturing by Means of Focal Shift Reduction," Lasers in Manufacturing Conference 2015, 8 pages (2015).
Tofail et al., "Additive manufacturing: scientific and technological challenges, market uptake and opportunities," *Materials Today*, pp. 1-16 (2017).
Tominaga et al., "Femtosecond Experiments and Absolute Rate Calculations on Intervalence Electron Transfer in Mixed-Valence Compounds," *J. Chem. Phys.*, 98:1228-1243 (Jan. 15, 1993).
Tominaga et al., "Ultrafast Studies of Intervalence Charge Transfer," *Ultrafast Phenomena VIII*, (Springer-Verlag, New York), pp. 582-584 (1993).
Trapp et al., "In situ absorptivity measurements of metallic powders during laser powder-bed fusion additive manufacturing," *Applied Materials Today*, 9:341-349 (2017).
"Triple Clad Ytterbium-Doped Polarization Maintaining Fibers," nuFERN Driven to Light Specifications, 1 page (Jan. 2006).
Ulmanen, "The Effect of High Power Adjustable Ring Mode Fiber Laser for Material Cutting," M.S. Thesis, Tampere University of Technology, 114 pages (May 2017).
Van Newkirk et al., "Bending sensor combining multicore fiber with a mode-selective photonic lantern," *Optics Letters*, 40:5188-5191 (Nov. 15, 2015).
Valdez et al., "Induced porosity in Super Alloy 718 through the laser additive manufacturing process: Microstructure and mechanical properties," *Journal of Alloys and Compounds*, 725:757-764 (Jul. 22, 2017).
Varshney et al., "Design of a flat field fiber with very small dispersion slope," Optical Fiber Technology, 9(3):189-198 (Oct. 2003).
Villatoro et al., "Photonic Crystal Fiber Interferometric Vector Bending Sensor," Optics Letters, 40(13):3113-3116 (Jul. 1, 2015).
Wang et al., "Mechanisms and characteristics of spatter generation in SLM processing and its effect on the properties," Materials & Design, 117(5): 121-130 (Mar. 5, 2017).
Wang et al., "Selective laser melting of W—Ni—Cu composite powder: Densification, microstructure evolution and nano-crystalline formation," *International Journal of Refractory Metals & Hard Materials*, 70:9-18 (Sep. 9, 2017).
Website describing 3-Axis Laser Scanning Systems at http://www.camtech.com/index.php?option=com_content&view=article&id=131&Itemid=181, 4 pages, accessed Dec. 31, 2014.
Wetter et al., "High power cladding light strippers," Proc. of SPIE, 6873:687327-1-687327-8 (Jan. 21, 2008).

(56) References Cited

OTHER PUBLICATIONS

Willis et al., "Printed Optics: 3D Printing of Embedded Optical Elements for Interactive Devices," UIST 12: Proceedings of the 25th annual ACM symposium on user interface software and technology, 10 pages (Oct. 31, 2012).

Wilson-Heid et al., "Quantitative relationship between anisotropic strain to failure and grain morphology in additively manufactured Ti—6Al—4V," *Materials Science & Engineering A*, 706:287-294 (Sep. 6, 2017).

Wischeropp et al., "Simulation of the effect of different laser beam intensity profiles on heat distribution in selective laser melting," Laser in Manufacturing Conference 2015, 10 pages (2015).

Xiao et al., "Effects of laser modes on Nb segregation and Laves phase formation during laser additive manufacturing of nickel-based superalloy," *Materials Letters*, 188:260-262 (Nov. 1, 2016).

Xiao et al., "Fiber coupler for mode selection and high-efficiency pump coupling," *Optics Letters*, 38:1170-1172 (Apr. 1, 2013).

Xie et al., "Correction of the image distortion for laser galvanometric scanning system," Optics & Laser Technology, 37:305-311 (Jun. 2005).

Xu et al., "The Influence of Exposure Time on Energy Consumption and Mechanical Properties of SLM-fabricated Parts," 2017 Annual International Solid Freeform Fabrication Symposium, 7 pages (2017)—Abstract only.

Yan et al., "Formation mechanism and process optimization of nano $Al_2O_3$—$ZrO_2$ eutectic ceramic via laser engineered net shaping (LENS)," *Ceramics International*, 43:1-6 (2017).

Yaney et al., "Distributed-Feedback Dye Laser for Picosecond UV and Visible Spectroscopy," *Rev. Sci. Instrum*, 71:1296-1305 (Mar. 2000).

Ye et al., "Mold-free fs laser shock micro forming and its plastic deformation mechanism," *Optics and Lasers in Engineering*, 67:74-82 (2015).

Yoda et al., "Beam Quality Factor of Higher Order Modes in a Step-Index Fiber," Journal of Lightwave Technology, 24(3):1350-1355 (Mar. 2006).

Yu, "Laser Diode Beam Spatial Combining," Ph.D. Thesis, Politecnico di Torino, 106 pages (Jun. 6, 2017).

Yu et al., "1.2-kW single-mode fiber laser based on 100-W high-brightness pump diodes," *Proc. of SPIE*, 8237:82370G-1-82370G-7 (Feb. 16, 2012).

Yu et al., "Development of a 300 W 105/0.15 fiber pigtailed diode module for additive manufacturing applications," *Proc. of SPIE*, 10086:100860A-1-100860A-5 (Feb. 22, 2017).

Yu et al., "Laser material processing based on non-conventional beam focusing strategies," 9th International Conference on Photonic Technologies LANE 2016, pp. 1-10 (2016).

Yusuf et al., "Influence of energy density on metallurgy and properties in metal additive manufacturing," *Materials Science and Technology*, 33:1269-1289 (Feb. 15, 2017).

Zavala-Arredondo et al., "Diode area melting single-layer parametric analysis of 316L stainless steel powder," *Int. J. Adv. Manuf. Technol.*, 94:2563-2576 (Sep. 14, 2017).

Zavala-Arredondo et al., "Laser diode area melting for high speed additive manufacturing of metallic components," *Materials and Design*, 117:305-315 (Jan. 3, 2017).

Zhirnov et al., "Laser beam profiling: experimental study of its influence on single-track formation by selective laser melting," *Mechanics & Industry*, 16:709-1-709-6 (2015).

Zhu et al., "Effect of processing parameters on microstructure of laser solid forming Inconel 718 superalloy," *Optics and Laser Technology*, 98:409-415 (Sep. 5, 2017).

Zou et al., "Adaptive laser shock micro-forming for MEMS device applications," *Optics Express*, 25:3875-3883 (Feb. 20, 2017).

\* cited by examiner

FINE-SCALE TEMPORAL CONTROL FOR LASER MATERIAL PROCESSING

CROSS REFERENCE TO RELATED APPLICATION

This application is a continuation of U.S. patent application Ser. No. 16/569,403, filed Sep. 12, 2019, now U.S. Pat. No. 11,331,756, which is a continuation of U.S. patent application Ser. No. 15/357,484, filed Nov. 21, 2016, now U.S. Pat. No. 10,434,600, which claims the benefit of U.S. Provisional Patent Application No. 62/292,108, filed Feb. 5, 2016, and U.S. Provisional Patent Application No. 62/258,774, filed Nov. 23, 2015, all of which are incorporated by reference herein in their entirety.

FIELD

The disclosure pertains to laser material processing.

BACKGROUND

In recent years, additive manufacturing and 3D printing techniques have grown in popularity as the technology of forming objects with sequential layers has matured and become widely accessible. In particular, it may now be possible for laser-based methods, such as selective laser melting (SLM) and selective laser sintering (SLS), to supplant traditional techniques for manufacturing industrial-grade objects, such as casting and machining. However, numerous obstacles remain. For example, conventional additive manufacturing methods are typically unable to create objects as quickly, or that are as reliable in their finished state, as their traditionally-manufactured counterparts. Furthermore, the created objects often do not have superior precision detail or feature resolution. Accordingly, a need remains for innovation directed to solving the problems and drawbacks associated with conventional additive manufacturing apparatus and methods.

SUMMARY

According to some embodiments, methods comprise directing a laser beam to a target along a scan path at a variable scan velocity, and adjusting a digital modulation during movement of the laser beam along the scan path and in relation to the variable scan velocity so as to provide a fluence at the target within a predetermined fluence range along the scan path.

According to further embodiments, methods comprise directing a laser beam to a target along a scan path which includes adjusting a width of the laser beam with a zoom beam expander so as to provide the laser beam with a variable spot size at the target, receiving the laser beam from the zoom beam expander by a 3D scanning system having a z-axis focus adjust optical system and a galvanometer scanning system, and scanning the laser beam with the variable spot size along the scan path at the target.

According to further embodiments, apparatus comprise a laser source situated to emit a laser beam, a 3D scanner situated to receive the laser beam and to direct the laser beam along a scan path in a scanning plane at the target, and a laser source digital modulator coupled to the laser source so as to produce a fluence at the scanning plane along the scan path that is in a predetermined fluence range as the laser beam scan speed changes along the scan path. In additional examples, apparatus further comprise a zoom beam expander situated to receive the laser beam from the laser source and to change a width of the laser beam received by the 3D scanner so as to change a size of a focused laser spot of the laser beam in the scanning plane.

According to additional embodiments, methods comprise focusing a laser beam at a target within a focus field, scanning the focused laser beam at a variable speed along a scan path, and digitally modulating the laser beam during the scan movement along the scan path so as to adjust a laser beam average power received by the target along the scan path and so as to provide the target with a fluence that is above or below one or more laser process thresholds associated with the target.

According to further examples, methods comprise directing a laser beam to a target along a scan path at a variable scan velocity, and adjusting a collimated width of the laser beam with a zoom beam expander based on the variable scan velocity. In some examples, the collimated width is adjusted so as to provide the laser beam with a variable spot size at the target and a fluence at the target within a predetermined fluence range along the scan path. Some examples can further comprise adjusting a digital modulation of the laser beam based on the variable scan velocity.

In additional embodiments, methods comprise adjusting a width of a laser beam with a zoom beam expander so as to provide the laser beam with a variable spot size at a target, directing the laser beam to the target along a scan path, and a digitally modulating the laser beam in relation to the variable spot size so as to provide a fluence at the target within a predetermined fluence range along the scan path. In further examples, the laser beam is directed to the target along a scan path at a variable scan speed and the digital modulation is adjusted so as to maintain the fluence at the target within the predetermined fluence range along the scan path.

The foregoing and other objects, features, and advantages of the disclosed technology will become more apparent from the following detailed description, which proceeds with reference to the accompanying figures.

DETAILED DESCRIPTION

Figure 1:
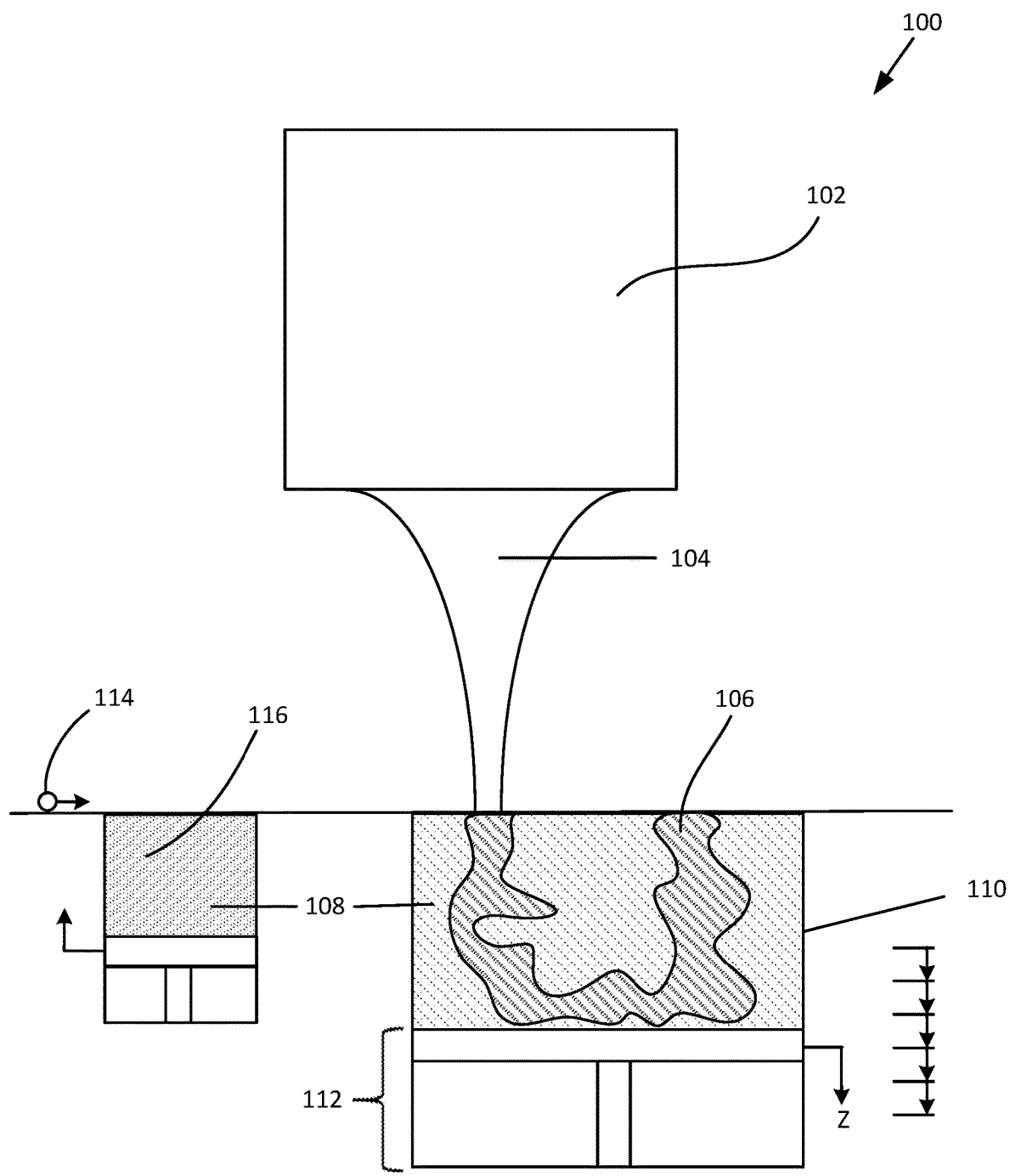
FIG. 1 shows a side view schematic of an additive manufacturing apparatus.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

As used herein, laser beams and associated optical radiation refers to electromagnetic radiation at wavelengths of between about 100 nm and 10 µm, and typically between about 500 nm and 2 µm. Examples based on available laser diode sources and optical fibers generally are associated with wavelengths of between about 800 nm and 1700 nm. In some examples, propagating optical radiation is referred to as one or more beams having diameters, asymmetric fast and slow axes, beam cross-sectional areas, and beam divergences that can depend on beam wavelength and the optical systems used for beam shaping. For convenience, optical radiation is referred to as light in some examples, and need not be at visible wavelengths.

Representative embodiments are described with reference to optical fibers, but other types of optical waveguides can be used having square, rectangular, polygonal, oval, elliptical or other cross-sections. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

In the examples disclosed herein, a waveguide core such as an optical fiber core is doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam.

The term brightness is used herein to refer to optical beam power per unit area per solid angle. In some examples, optical beam power is provided with one or more laser diodes that produce beams whose solid angles are proportional to beam wavelength and beam area. Selection of beam area and beam solid angle can produce pump beams that couple selected pump beam powers into one or more core or cladding layers of double, triple, or other multi-clad optical fibers. The term fluence is used herein to refer energy per unit area. In some embodiments, fluence is delivered to a target in along a scan path so as to heat or otherwise laser process the target in a selected area associated with the scan path. Scan paths can have various shapes, including linear, curved, retraced, segmented, etc. Output beams generated by optical systems are directed along the scan paths and can have various brightnesses and uniformity characteristics along one or more axes transverse to the propagation direction. Typical output beams are continuous-wave with various output powers, including average beam powers greater than or equal to 100 W, 500 W, 1 kW, 3 kW, 6 kW, 10 kW, or 20 kW, depending on the particular application. Continuous-wave output beams are digitally modulated as discussed further herein.

FIG. 1 is an apparatus 100 that includes a laser system 102 emitting and directing a laser processing beam 104 to a target 106 in an additive manufacturing process. The target 106 is generally formed layer by layer from a fine metal powder 108 that is situated in a container 110. Once a layer is laser patterned, a z-stage 112 lowers the container 110 and a new layer of fine metal powder 108 is rolled out with a roller 114 that provides additional fine metal powder 108 from an adjacent reservoir 116. The new layer is then laser patterned, and the process is repeated multiple times with subsequent fine metal powder layers in order to form a three dimensional object.

Figure 2A:
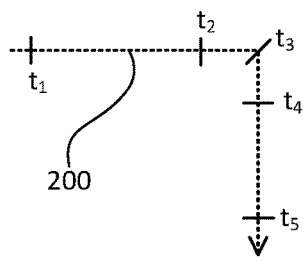
FIG. 2A shows a top view of a laser patterning scan path.

In FIG. 2A an example of a scan path 200 is shown along which a laser processing beam is scanned in the process of laser patterning a target, such as an additive manufacturing target. At a time $t_1$, the laser processing beam is traveling with scan velocity, e.g., a particular speed and a direction to the right in the plane of FIG. 2A. The scan speed of the laser processing beam begins to slow as the laser processing beam reaches another position at a time $t_2$ closer to a path corner. At a time $t_3$, the laser processing beam slows to become momentarily motionless in order to change direction and move downward in the plane of FIG. 2A. At a time $t_4$, the scan speed of the laser processing beam has increased, and at time $t_5$ the laser processing beam has reached the same speed as at time $t_1$.

Figure 2B:
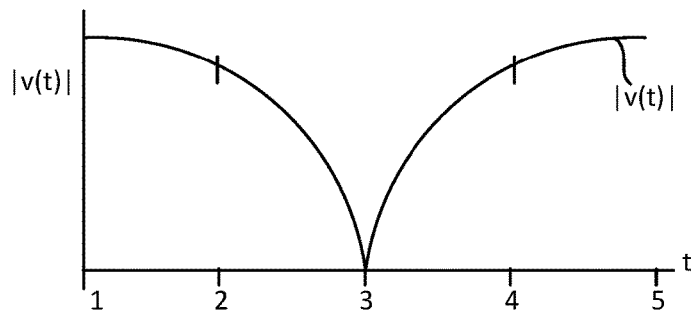
FIGS. 2B-2I show graphs of variables related to a scanned laser beam.
Figure 2C:
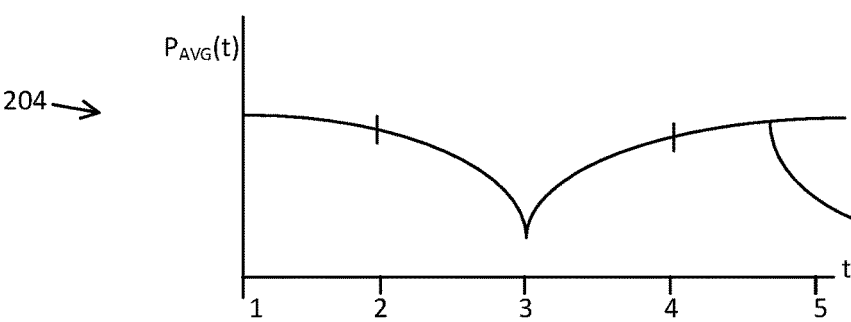
Figure 2D:
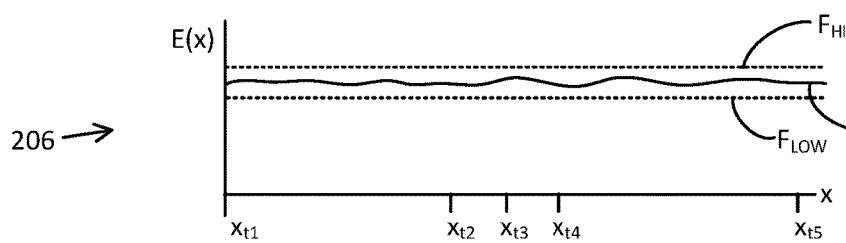

Below the scan path 200, FIG. 2B shows a graph 202 of speed, $|v(t)|$, versus time that corresponds with the times $t_1$-$t_5$ of the scan path 200. As can be seen, a speed of the laser processing beam has an initial scan speed at $t_1$, slows to rest at time $t_3$ where the laser processing beam changes direction, and increases scan speed to a final scan speed at $t_5$ that can be the same or different from the initial scan speed. Below the graph 202, in FIG. 2C, is a graph 204 of a laser processing beam average power $P_{AVG}(t)$ versus time corresponding with the times $t_1$-$t_5$ and the scan path 200, and in FIG. 2D, a graph 206 of fluence E(x) received by a processing target along a scan path, such as the scan path 200. In typical laser process examples, the fluence E(x) should remain within a predetermined range, such as between two thresholds, such as constant thresholds $F_{HIGH}$, $F_{LOW}$. In some examples, the thresholds and corresponding predetermined range can vary or be modulated depending on various factors, such as feature size and shape, material-dependent characteristics, such as heating and cooling rates, etc. For example, different targets, or different portions or regions of the same target, can have different material properties. Also, different laser processing effects can be achieved in different process windows, including fluence windows. By maintaining fluence within a corresponding range or ranges, the laser energy can perform the desired change to the target. For example, in a selective laser melting process an excess fluence may damage the target, exacerbating a heat affected zone, and negatively affect various parameters of the finished object, such as tensile strength and reliability. An insufficient fluence can prevent the target material from melting correctly thereby weakening the finished object. By maintaining fluence within a predetermined range during laser processing, the finished object can be fabricated with superior material characteristics.

In some embodiments, in order to maintain fluence E(x) within the predetermined range (e.g., between $F_{HIGH}$ and $F_{LOW}$), the average power $P_{AVG}(t)$ of the laser processing beam decreases corresponding to beam movement information, such as a decrease in scanning speed $|v(t)|$ of the laser processing beam along the scan path 200. However, for various reasons, a direct continuous decrease in average power $P_{AVG}(t)$ cannot be accomplished or cannot be accomplished in an efficient manner. For example, the laser scanning components, such as mirrors and optics, can move at a speed slower than the laser patterning process demands, resulting in a laser fluence at the target that is above $F_{HIGH}$ or below $F_{LOW}$. In some instances, the dynamics of a gain medium of a laser source generating the laser processing beam do not respond quickly enough to a desired continuous or discontinuous change to the power level of the laser processing beam.

Figure 2E:
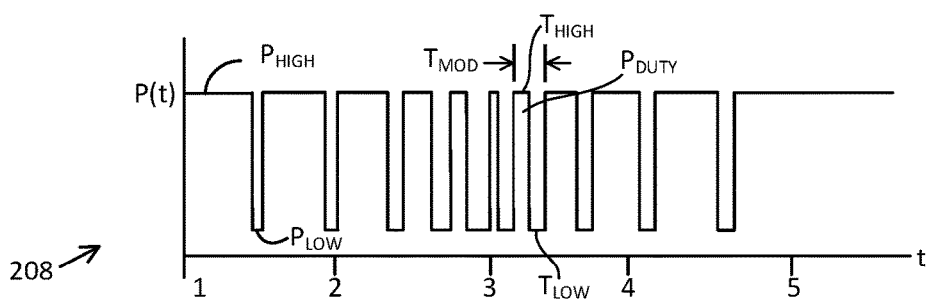

Below the graph 206, in FIG. 2E, is a graph 208 depicting a modulated power P(t) of the laser processing beam that can produce rapid changes in average power $P_{AVG}(t)$ even with slow scanner dynamics or other laser system deficiencies. The modulated power P(t) alternates between a high power $P_{HIGH}$ and a low power $P_{LOW}$, and the low power $P_{LOW}$ can be zero or non-zero. The modulated power P(t) includes a variable modulation period $T_{MOD}$ and a variable duty cycle $P_{DUTY}$ that is a percentage of $T_{MOD}$. In general, as a speed associated with the scanning of a laser processing beam decreases, one or more of the modulation period $T_{MOD}$ and duty cycle $P_{DUTY}$ can change so as to decrease the average power of the laser processing beam and to maintain the fluence received by the target within a predetermined range. In some examples, other information associated with the scan path 200 is used to maintain fluence E(x) within the predetermined range, such as proximity of the scan path 200 to an adjacent portion of the scan path 200 previously scanned (including a retrace), ambient temperature, localized temperature, heating and cooling rates, scan acceleration, scan position, etc. In further examples, a delivered fluence and a peak power of the laser beam delivering the fluence remain within predetermined ranges in accordance with laser process requirements. In particular embodiments, fine features (on the order of microns) are laser processed as laser processing beam scan velocity changes rapidly during the formation of smaller target details. In some embodiments, the modulation period $T_{MOD}$ can be varied so that an average beam power changes based on response dynamics of a gain medium of a laser source generating the beam or other components of the laser source.

Figure 2F:
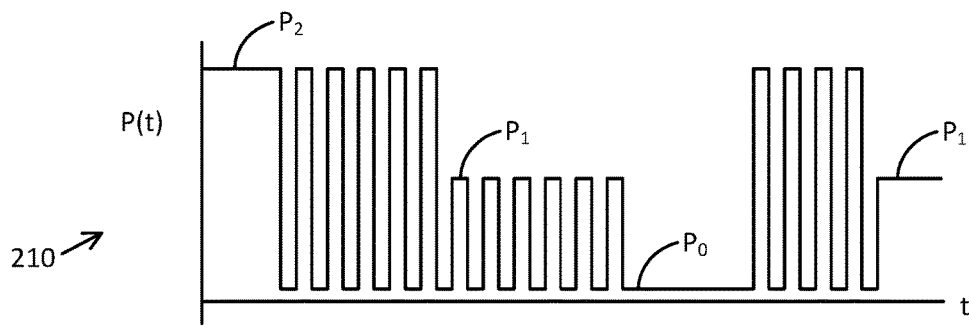

In the example shown in graph 208, at the time $t_1$ the power of the laser processing beam is constant at power $P_{HIGH}$. As the speed $|v(t)|$ of the laser processing beam decreases, the laser processing beam changes from constant power to a modulated power, switching from $P_{HIGH}$ to $P_{LOW}$ and back to $P_{HIGH}$ at a frequency associated with the decrease in scanning speed of the laser processing beam. As the speed $|v(t)|$ of the scanning of the laser processing beam continues to decrease as the time approaches $t_2$ and $t_3$, the power modulation frequency increases, decreasing the period $T_{MOD}$ and the duty cycle $T_{HIGH}/T_{HIGH}+T_{LOW}$, wherein $T_{HIGH}$ is a duration during which the power $P_{HIGH}$ is applied and $T_{LOW}$ is a duration in which the power $P_{LOW}$ is applied. The decreased duty cycle reduces the average power $P_{AVG}$ for the laser processing beam and provides the laser processing fluence within the predetermined range. Thus, by adjusting a digital modulation of the power of the laser processing beam, the average power of the laser processing beam can be adjusted so that a fluence may be provided at target that remains within a predetermined fluence range corresponding to the target. With additional reference to graph 210 in FIG. 2F, in some embodiments, the laser processing beam can change to or switch between more than two power levels, such as P0, P1, and P2, and digitally modulated to produce rapid changes in average power and associated fluence. In further examples, a decrease in average laser processing beam power can be provided by adjusting a digital modulation of the laser processing beam such that a power level is within a range of peak powers suitable for performing a laser process.

Figure 2G:
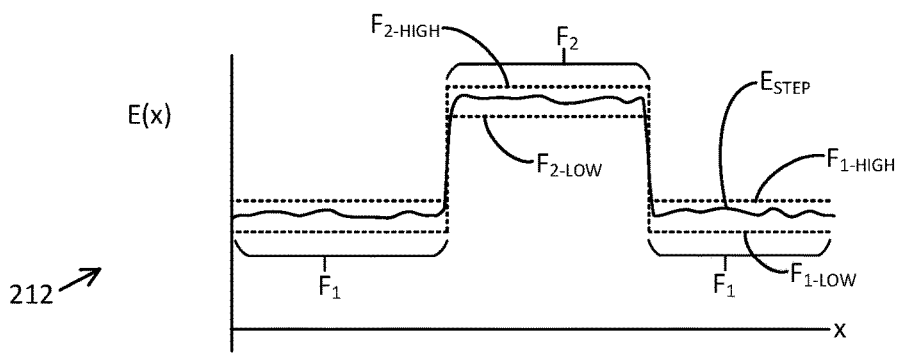
Figure 2H:
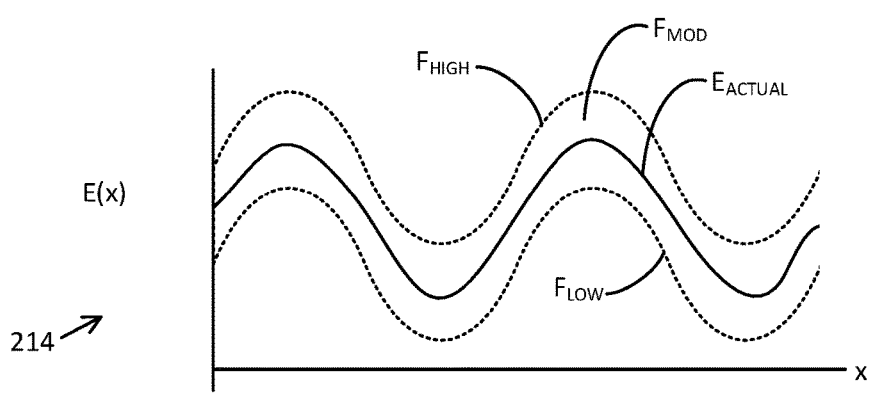

As discussed above, predetermined fluence ranges can vary according to laser processing factors, and examples herein can produce modulated optical beam powers that maintain fluence within variable fluence ranges. FIG. 2G shows a graph 212 of fluence $E_{STEP}$ with a targeted fluence that varies step-wise from a first fluence $F_1$ with thresholds $F_{1\text{-}HIGH}$, $F_{1\text{-}LOW}$ to a second fluence $F_2$ with thresholds $F_{2\text{-}HIGH}$, $F_{2\text{-}LOW}$. In some examples, with a constant scan velocity for a laser processing beam, such as with a straight scan path, a digitally modulated beam with a fixed period and duty cycle can provide the first fluence $F_1$ and an unmodulated beam can provide the second fluence $F_2$. Digital modulation of the power can allow for more a rapid transition between the first and second fluences $F_1$, $F_2$. In FIG. 2H, a graph 214 shows a predetermined fluence range $F_{MOD}$ that varies according to a sinusoid between respective upper and lower fluence boundaries $F_{HIGH}$, $F_{LOW}$. The fluence $E_{ACTUAL}$ delivered to a target can be maintained within the fluence range $F_{MOD}$ through a digital modulation of the optical power of the laser processing beam. In some laser processing examples, the frequency of the fluence modulation can be relatively fast, including 1 kHz, 10 kHz, 100 kHz, or greater. In different examples, high frequency fluence oscillation is dependent on or independent from a fluence oscillation phase.

Figure 2I:
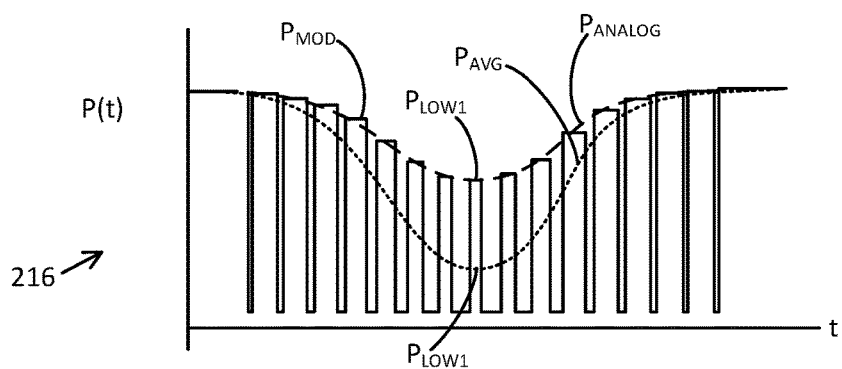

In some examples, an analog modulation can be applied to change the average power of the laser processing beam in conjunction with the digital modulation. However, the analog modulation typically has a slower response time for achieving a desired reduction in average power for maintaining fluence within the predetermined range. To increase process efficiency, and to robustly maintain fluence within a predetermined fluence range irrespective of various system variables such as scanner dynamics, a digital modulation is typically used or a hybrid digital and analog modulation is used to adjust the average power of the laser processing beam and provide more rapid response to preserve fluence within a predetermined range. For example, referring to FIG. 2I, a graph 216 shows a digitally modulated signal $P_{MOD}$ that includes plurality of modulation portions with power maximums that decrease to a minimum power $P_{LOW1}$ according to an analog command signal $P_{ANALOG}$. The actual average output power commanded and produced for the laser processing beam can include trace a path $P_{AVG}$ that can include a more rapid change in average beam power and a lower minimum power $P_{LOW2}$.

Figure 3:
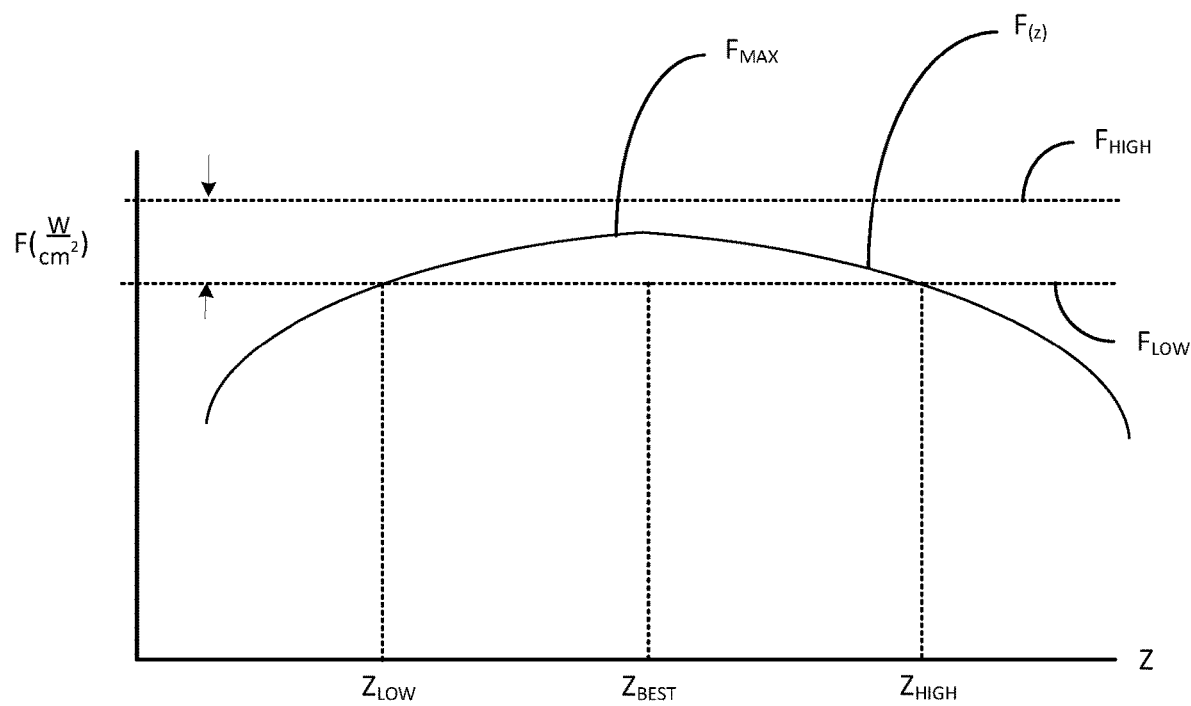
FIG. 3 is a graph of fluence with respect to focus position.

FIG. 3. is a graph of fluence F(z) of a laser processing beam with respect to a focus position Z associated a scanner coupled to the laser processing beam. In general, the fluence F(z) is a maximum at a fluence $F_{MAX}$ where the laser processing beam is brought into a best focus position $Z_{BEST}$ in the direction of propagation of the laser processing beam. As the focus distance of the laser processing beam increases or decreases from $Z_{BEST}$, effectively defocusing the laser processing beam, the fluence associated with the new focus position decreases as the laser processing beam expands and defocuses. During laser processing it is generally desirable for the fluence F(z) of the laser processing beam to remain within fluence boundaries $F_{HIGH}$ and $F_{LOW}$ by constraining or controlling defocus between focus positions $Z_{LOW}$ and $Z_{HIGH}$, for example, so that the laser process can produce the corresponding change in the target. While the fluence boundaries can be variable, in typical examples the fluence boundaries are fixed. In some embodiments, a 3D scanner is used to scan the laser processing beam at the target with a flatter focal field curvature than an Fθ lens or other scanning optic over a large pattern processing area. Thus, the fluence delivered by the laser processing beam that is scanned at the target is more likely to stay or more easily maintained within the fluence boundaries $F_{HIGH}$, $F_{LOW}$.

Figure 4:
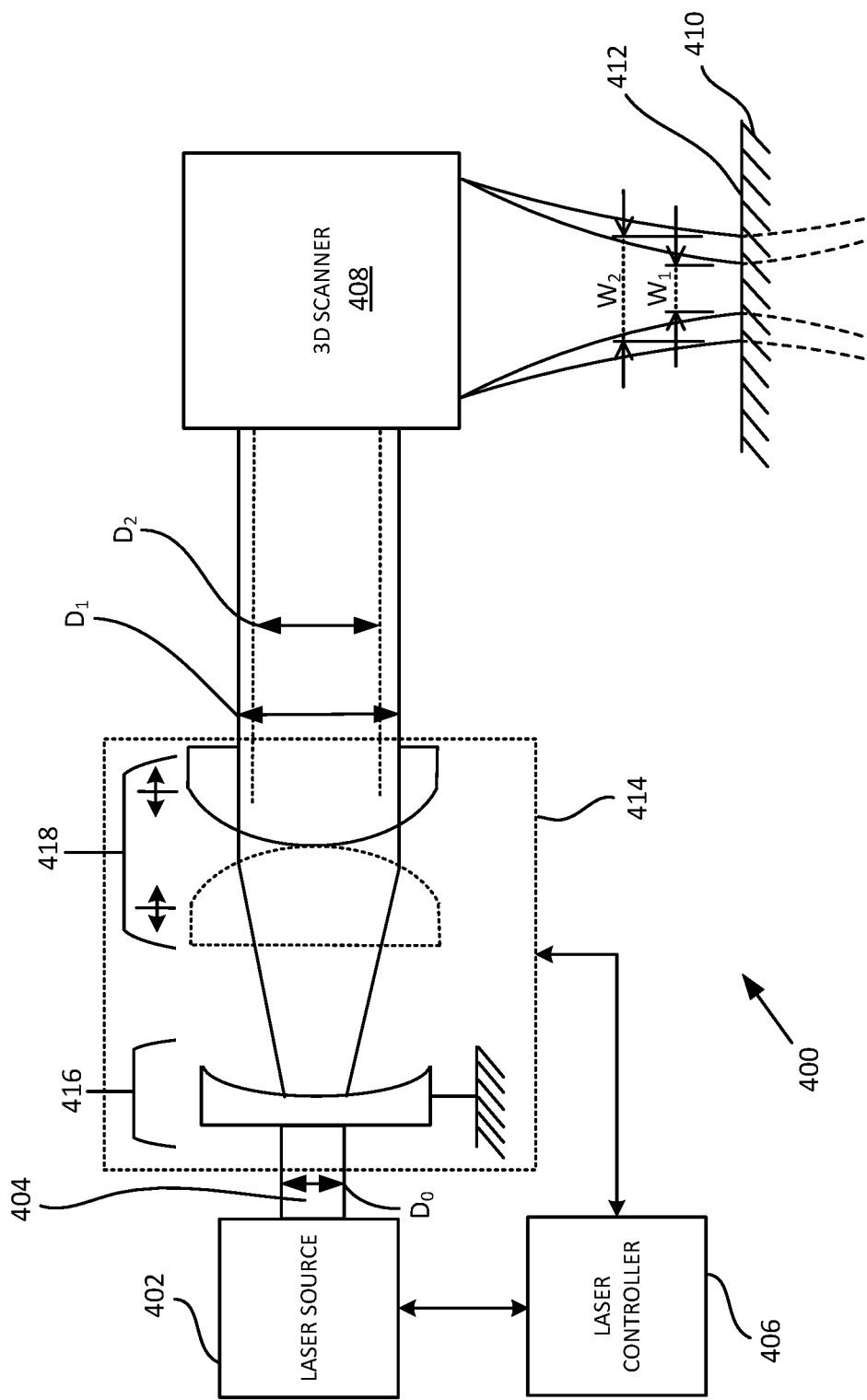
FIG. 4 shows a side view schematic of a laser patterning apparatus.

In FIG. 4, an apparatus 400 includes a laser source 402 situated to emit a laser processing beam 404. A laser controller 406 is coupled to the laser source 402 in order to control the power, including a modulated power, of the laser processing beam 404. A 3D scanner 408 is situated to receive the laser processing beam 404 and to direct the laser processing beam to a target 410. With the 3D scanner 408, the laser processing beam 404 is generally brought to focus in a focal plane 412 that is parallel to and aligned with a flat surface of the target 410. However, in some examples, the 3D scanner 408 allows the focal position to vary so as to provide a non-flat focal field that can correspond to a non-uniform target surface. In typical examples, the 3D scanner 408 includes an XY galvanometer scan mirror set and a Z-position focus group that changes the focus position of the of the beam at the focal plane 412 based on the position of the galvo scan mirrors. The apparatus 400 also includes a zoom beam expander 414 situated to receive the laser processing beam 404 with a collimated input diameter Do and adjust beam width so that the laser processing beam exiting the zoom beam expander 414 has a same or different collimated diameter $D_1$ along one or more directions transverse to the propagation path of the laser processing beam. The laser processing beam 404 with the collimated diameter $D_1$ is received by the 3D scanner 408 and is scanned and focused at the target 410 with a spot size $W_1$. The zoom beam expander 414 can also adjust the laser processing beam 404 so as to have a collimated diameter $D_2$ that is smaller than the collimated diameter $D_1$. The smaller collimated diameter $D_2$ is received by the 3D scanner and scanned and focused at the target with a spot size $W_2$ that is larger than spot size $W_1$ due to the smaller collimated diameter $D_2$.

The zoom beam expander 414 can be constructed in various ways. In typical examples (and as shown in FIG. 4), the zoom beam expander 414 includes a set of entrance group optics 416 that are fixed and situated to receive the laser processing beam 404 from the laser source 402. A set of exit group optics 418 is situated to receive an expanding beam from the entrance group optics 416 and through movement along an optical axis of one or more optics of the exit group optics 418, increase or decrease the diameter of the laser processing beam 404 emitted from the zoom beam expander 414. To provide the controlled movement for changing the collimated diameter of the laser processing beam 404, the zoom beam expander 414 is coupled to the laser controller 406. By controllably expanding the diameter of the laser processing beam 404 that is optically coupled into the 3D scanner 408, a controlled variation in spot size can be provided at the target for various effects.

In typical examples, different spot sizes produced with the zoom beam expander 414 are used to laser process features at the target 410 of varying size and shape. In some examples, the laser processing beam 404 is scanned with a variable scan velocity along a scan path at the target 410 so that the target receives a fluence in a predetermined fluence range by varying the spot size in relation to the variable scan velocity. In further examples, larger features are laser processed with the laser processing beam 404 with a larger spot size, e.g., with the spot size $W_2$ and a constant laser processing beam power, and smaller features are laser processed with the laser processing beam 404 with a smaller spot size, e.g., with the smaller spot size $W_1$ and a typically smaller digitally modulated laser processing beam power. By digitally modulating the laser processing beam power, the laser process can avoid or make optional an analog modulation of the beam power and the fluence delivered to the target can be maintained within a predetermined fluence range for the laser process as changes in spot size occur.

Figure 5:
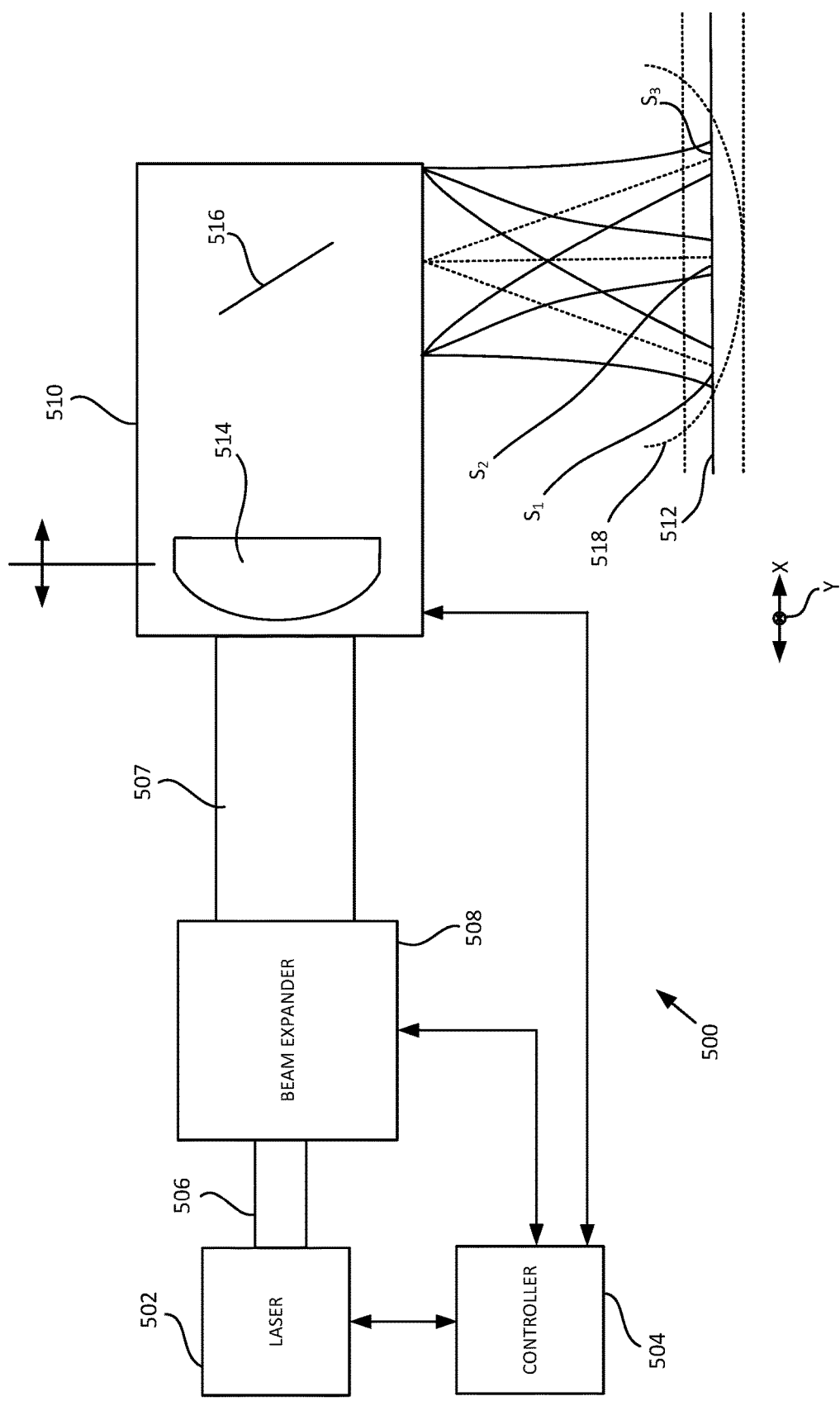
FIG. 5 shows another side schematic of a laser patterning apparatus.

FIG. 5 shows another apparatus 500 that includes a laser source 502 controlled by a laser controller 504 and situated to produce a collimated laser beam 506. A zoom beam expander 508 is situated to receive and to change the diameter of the collimated laser beam 506 to produce an expanded beam 507. A 3D scanner 510 is situated to receive the expanded beam 507 from the zoom beam expander 508 and to focus the expanded beam 507 to a spot in various positions, $S_1$-$S_3$, at a target 512. The 3D scanner 510 typically includes variable position focusing optics 514 that receive and focus the expanded beam 507 and a pair of galvo-controlled scan mirrors 516 that receive the focused beam and direct the focused beam to a particular position (typically in a focal plane) aligned with the target 512, e.g., to predetermined X-Y coordinates. The position of the laser beam spot at the target 512 can vary across a scan field associated with the 3D scanner 510. In a scanner that uses a fixed focusing optic, such as an Fθ lens, a field curvature 518 associated with the focal position of the Fθ lens is typically curved. Thus, for a laser beam focused at a position SN toward a periphery of the scan field, such as positions $S_1$ and $S_3$, defocus typically occurs. Such defocus can reduce the fluence received by the target 512 so that the fluence is outside of a predetermined range and uneven heating and uneven processing across the scan field can occur. The variable position focusing optics 514 (which can include one or more lenses, mirrors, diffractive optical elements, etc.) of the 3D scanner 510 allows a change in a focus position of the spot in relation to an X-Y position of the spot in the field of the 3D scanner 510. Thus, small adjustments can be made to the focus position of the spot so that field curvature associated with 3D scanner is flatter than other systems. The 3D scanner 510 is coupled to the laser controller 504 so as to receive a scanning and focusing signal that corresponds to pattern data for scanning and focusing the collimated laser beam 506 at the target. The pattern data can be stored in the laser controller 504 or can be received from an external source.

Figure 6:
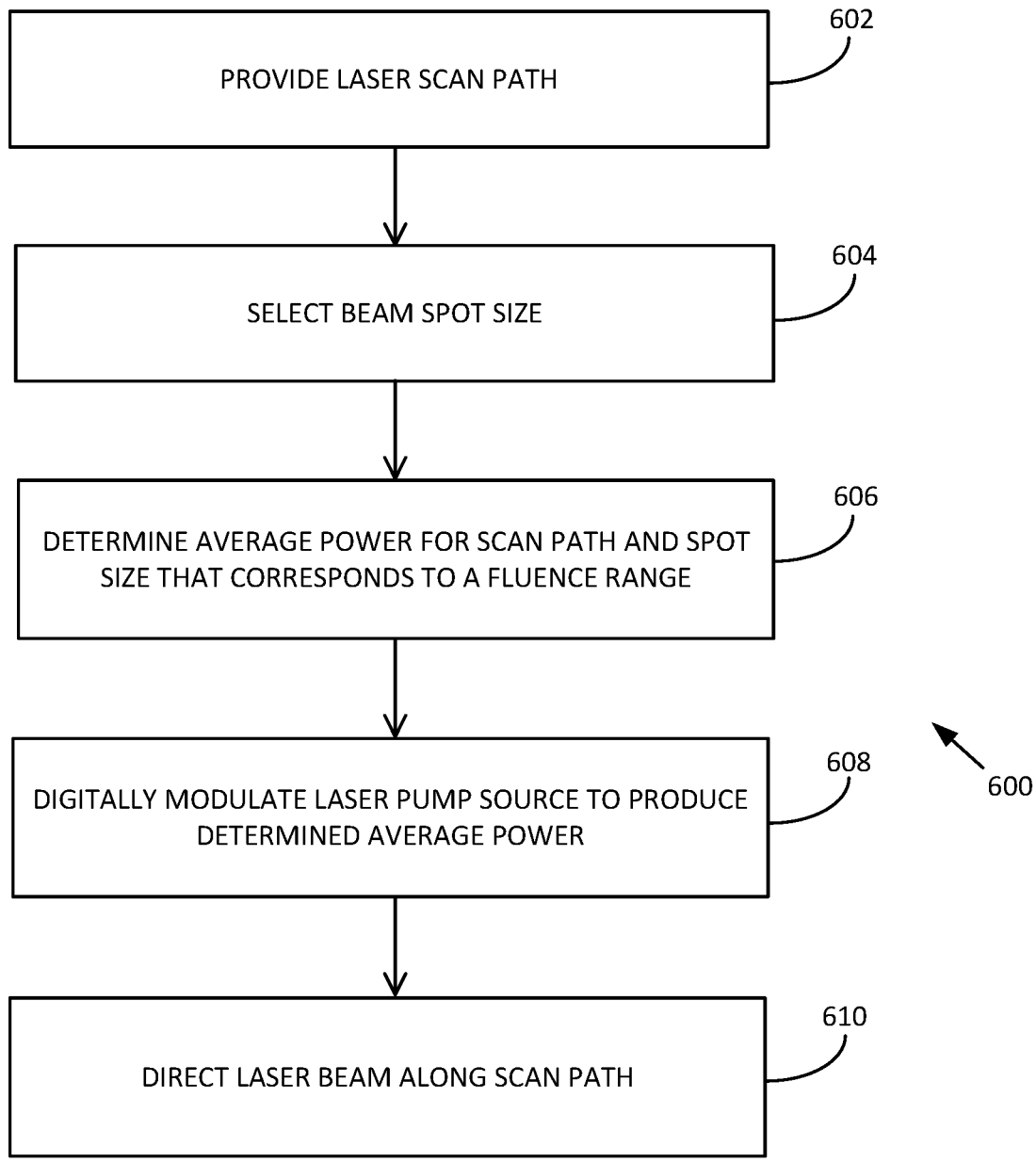
FIG. 6 is a flowchart of a laser patterning process.

In FIG. 6, a method 600 of laser processing a target includes, at 602, providing a scan path for a laser beam, and at 604, selecting a spot size for the laser beam at the target. For example, a laser beam scan path can be provided to a laser controller with a laser pattern file that includes data related to the position of the laser beam that is to be scanned across the target. The laser beam scan path can also be provided to the laser controller in real time so that receipt of a scan path signal by the laser controller or laser scanner occurs simultaneous with or in close temporal relation to the scanning of the laser beam at the target. At 606, an average power of the laser beam is determined based on the laser beam scan path and the laser beam spot size and a laser beam fluence range associated with laser processing of the target. The power of the laser beam is digitally modulated at 608 through digital modulation of one or more laser pump sources coupled to an active medium that produces the laser beam. The digitally modulated laser beam corresponds to the determined average power at 606, which can change significantly based on the scan path and spot size. At 610, the laser beam is directed along the scan path provided at 602. In further examples, an average power is determined for a scan path and the spot size of the laser beam is varied to correspond to the determined average power. In further examples, both digital modulation and a variable spot size are used to provide an average power to correspond to a predetermined fluence range.

Figure 7:
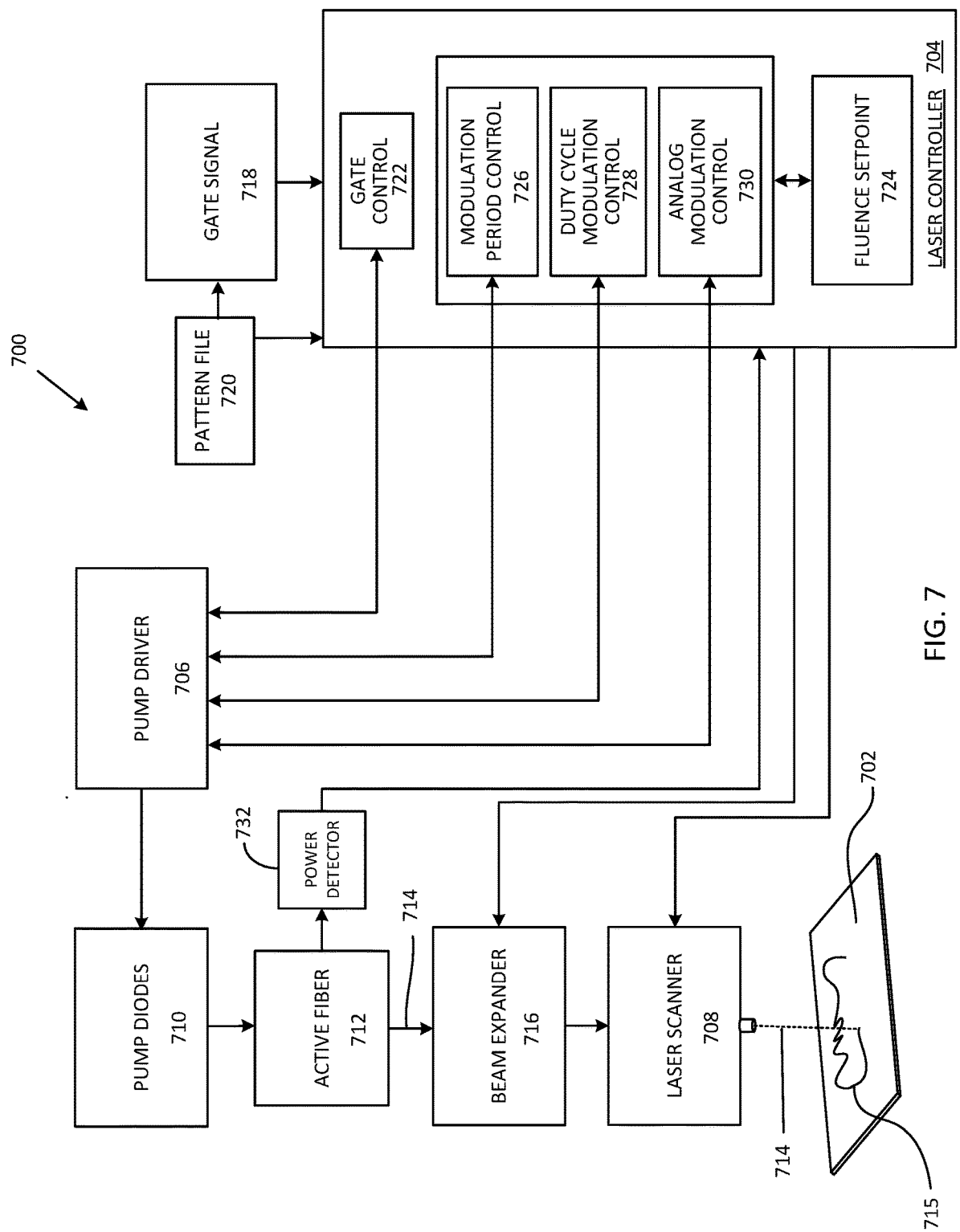
FIG. 7 is a schematic of a laser patterning system.

In FIG. 7, a laser system 700 is situated to laser pattern a target 702 with precision control of fluence at the target 702. The laser system 700 includes a laser controller 704 coupled to a pump driver 706, such as a voltage controlled AC/DC power supply or a voltage regulator coupled to a power supply, and laser scanner 708. The pump driver 706 drives pump diodes 710 based on one or more of a voltage and current. The pump diodes 710 are coupled to a laser gain medium, such as an active fiber 712, which uses the energy from the pump diodes 710 to generate a laser system beam 714. The laser system beam 714 is received by a zoom beam expander 716 that can change the collimated width of the laser system beam 714 exiting the zoom beam expander 716 in order to change the size of a focused spot of the laser system beam 714 in the same plane at the target 702 along one or more axes transverse to a propagation direction of the laser system beam 714. The laser scanner 708 receives the laser system beam 714 from the zoom beam expander 716 with a selected collimated beam width and directs the laser system beam 716 to the target 702 in order to process a pattern and deposit along a scan path 715 a laser fluence within a predetermined range associated with a laser process.

In some examples, the laser controller 704 is coupled to a gate signal 718 that provides the controller 704 with first state and second state conditions for the laser system beam 714 and that can be associated with the pattern formed on the target 702. For example, the gate signal 718 can correspond to a laser patterning data file 720 that provides on and off conditions so that as the laser system beam 714 is scanned, various features can be isolated or spaced apart from other features on the target 702 and complex features can be formed. The laser controller 704 includes a gate control 722 that communicates a gate control signal to the pump driver 706 so that the pump diodes 710 are energized to pump the active fiber 712 so as to correspond to the on and off associated with the gate signal. The laser patterning data file 720 can also provide various vector data, such as scan position data, for the laser system beam 714 to be scanned at the target 702. The laser controller 704 is coupled to the laser scanner 708, though in other examples the laser patterning data file 720 can be coupled directly to the laser scanner 708. Various connections can be wired or wireless, and file data can be stored in volatile or non-volatile memory. In further examples, the gate commands of the gate signal are stored in a memory of the laser controller 704.

In order to maintain laser fluence delivered to the target 702 within a predetermined range, the laser controller 704 includes fluence setpoint 724 coupled to a modulation period control 726, a duty-cycle modulation control 728, and an analog modulation frequency control 730, that are also coupled to the pump driver 706. The modulation period control 726 is situated to adjust a digital modulation period of the pump diodes 710. For example, the optical power output of the pump diodes can increase from a slower frequency and corresponding period to a faster frequency (e.g., from 10 kHz to 100 kHz, 200 kHz, or faster) and corresponding period or from a continuous on-state (e.g., 0 kHz) so that a power associated with the laser system beam 714 alternates or alternates more rapidly between two or more power levels (e.g., 10 kHz alternating between 10 W and 500 W).

The duty cycle control 728 is situated to adjust a power duty cycle of the pump diodes 710. Duty cycles can range from greater than 90% to less than 10% and can vary in relation to the modulation period. Selected duty cycles are typically large enough so that a suitable amount of laser processing beam energy may be generated in relation to the rise and fall times of the laser processing beam of a selected modulation period so as to maintain laser processing beam average power at a desired level. In some examples, a fixed modulation period is selected and a duty cycle is varied from 100% to less than 10% so as to produce a corresponding reduction in laser processing beam average power. In further examples, a modulation period decreases and a duty cycle decreases to correspond to a reduction in laser processing beam average power so that fine details associated with changes in scan velocity can be formed with the laser processing beam.

The modulation period control 726 and the duty cycle control 728 can produce a modulation change based on the fluence setpoint 724 in order to decrease or vary an average power of the laser system beam 714 at the target. In some embodiments, the decrease in average power can be associated with a decrease in the size of the spot of the laser system beam 714 at the target 702 or a change in beam scan velocity, such as a decrease in scan speed or change in scan direction, of the laser system beam 714 being scanned with respect to the target 702. The power of the laser system beam 714 can be detected by a power detector 732 coupled to one or more system components, such as the active fiber 712, with a corresponding signal of the detected power being coupled to the controller 704. The detected power of the laser system beam 714 can be used for general monitoring, emergency cutoff, etc., and also to assist in determining whether laser fluence remains within, above, or below one or more thresholds, boundaries, tolerances, etc., during laser processing. For example, the detected power can be compared with an average power calculated based on a particular digital modulation settings and the modulation period control 726 and duty cycle control 728 can scale or adjust modulation period and duty cycle to produce the laser system beam 714 with an average power that corresponds with the fluence setpoint 724. For example, the laser system 700 can be coupled to different types of laser scanners, pump diodes, active fibers, etc., each which could affect dynamics of the laser system 700 and the extent to which digital modulation adjustment affects fluence deposition.

In some examples, a digital modulation period and duty cycle that are adjusted based on the fluence setpoint 724 can be defined by the gate signal 718 prior to the coupling of the gate signal 718 to the laser controller 704. In further embodiments, the pattern file 720 can be coupled to the controller 704 and the gate signal 722 need not be externally provided. In additional embodiments, the analog modulation control 730 also is used to assist in maintaining laser fluence at the target 702 by combining it with the modulation period control 726 and the duty cycle control 728. Typically, the analog modulation of the output power of the laser system beam 714 alone responds too slowly to maintain the delivered laser fluence at the target 702 within the predetermined range associated with the fluence setpoint 724 or the fluence requirements of the laser process. Typically, this inability can be associated with dynamics of the electronics of the controller 704 or the pump diodes 710 and active fiber 712. However, dynamics of the zoom beam expander 716 and the laser scanner 708 can also vary. Thus, by using the modulation period control 726 and the duty cycle control 728 to digitally modulate the pump diodes 710, laser fluence delivered to the target 702 can be maintained within a predetermined range even with slow or inconsistent dynamics between various components of the laser system 700. In some examples, the combined effect on laser fluence from the modulation period control 726, duty cycle control 328, and the analog modulation control 730 can advantageously maintain fluence at desired levels.

In further examples, the modulation period control 726 can also adjust modulation period based on the pattern file 720 or other data associated with the laser scan path 715. In patterns associated with the target 702 where fine features are produced, such as multiple features in proximity to each other, the total heat load can affect laser process fluence thresholds for adjacent or retraced features. Modulation period control 726 and duty cycle control 728 can adjust power of the laser system beam 714 based on a delivered heat load to the target 702, a predicted or measured temperature associated with one or more portions of the target 702, or the dwell time of the laser system beam 714 in one or more areas of the target 702, etc. For example, the laser system beam 714 can be digitally modulated through a first scan movement change relative to the target 702 (e.g., a first turn of the laser system beam 714) in the laser scan path 715 and can be digitally modulated to reduce an average power of the laser system 714 to a greater extent during a second turn in proximity to the first turn.

Figure 8:
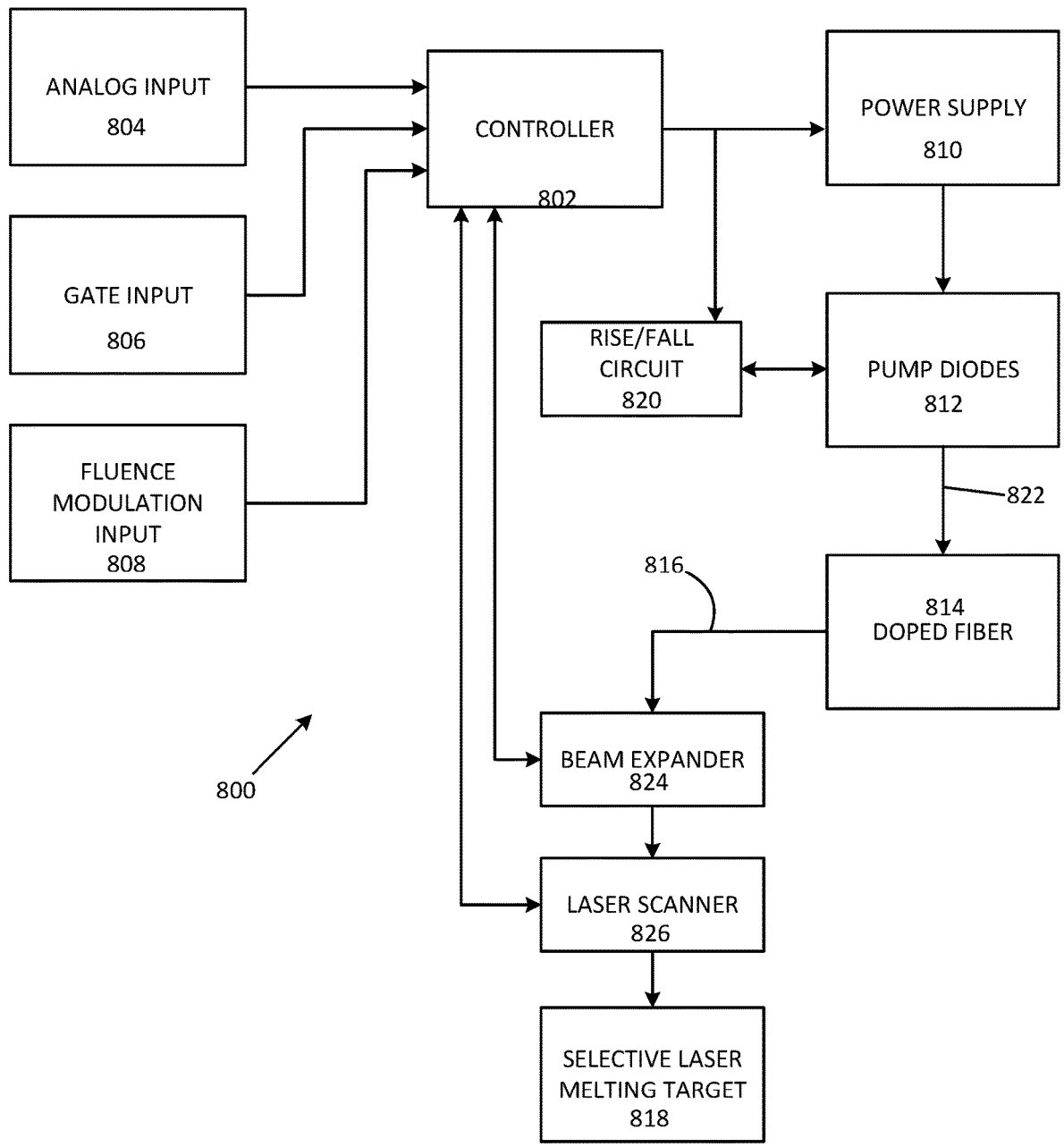
FIG. 8 is another schematic of a laser patterning system.

In FIG. 8, a laser system 800 includes a controller 802 situated to receive an analog signal at an analog input 804, a gate signal at a gate input 806, and a fluence modulation signal at a fluence modulation input 808. The controller 802 typically uses the gate signal to modulate or vary power provided by a power supply 810 to laser pump diodes 812, typically by varying drive currents supplied to the laser pump diodes 812. The laser pump diodes 812 are optically coupled to a doped fiber 814, or other laser gain medium that generates a laser system beam 816. The power of the laser system beam 816 can increase and/or decrease corresponding to the modulation of the gate signal, for example, so as to decrease between processing non-contiguous portions of a selective laser melting (SLM) target 818. A rise-fall circuit 820 is coupled to the controller 802 and the pump diodes 812 to control a rise time and a fall time of a pump current provided to the pump diodes 812 by the power supply 810. By controlling the rise time and fall time of the pump current, associated rise times, fall times, overshoots, and undershoots of one or more pump beams 822 generated by the pump diodes 812 can be selected. In some examples, suitable response times for the pump beams 822 can be balanced against pump diode reliability. The laser system beam 816 generated by the doped fiber 814 is also coupled to a zoom beam expander 824 situated to change the spot size of the laser system beam 814 that is focused through a laser scanner 826 into the same plane at the SLM target 818. Rise times are typically defined as the duration required for a parameter, such as laser beam power, to rise from a selected portion of a steady state value to another selected portion of the steady state value, e.g., 2% and 98%, 5% and 95%, 10% and 90%, 1% and 95%, etc. Fall times can be similarly defined as a duration for a fall from a steady state value. Initial values or steady state fall values can be zero or non-zero. Overshoots and undershoots can be defined as a percentage of a steady state value.

The fluence modulation signal can also be used to modulate, vary, or control the laser system beam power to the same or different power levels associated with the gate signal. The fluence modulation signal can be used to digitally modulate the pump currents of the pump diodes 812 so that an average power of the laser system beam 816 is varied corresponding to a variable velocity of the laser system beam 816 being scanned by the laser scanner 826 at the SLM target 818. For example, a decrease in digital modulation period or a reduction in duty-cycle for the same period can cause a rapid reduction in average power of the laser system beam 816. The variable velocity of the laser system beam 816 scanning along the scan path, or the change in spot size of the laser system beam 816 with the beam expander 824, can produce an undesirable fluence variation at the SLM target 818 that can adversely affect the suitability of the finished product, and the fluence modulation signal can be used to compensate for the fluence variation. The fluence modulation signal can also be used to digitally modulate the pump currents to adjust a power of the laser system beam 816 to correspond to different spot sizes produced by the zoom beam expander 824. In some embodiments, the fluence modulation signal and the gate signal can be provided through a common input. In further embodiments, the fluence modulation signal can be used to modulate or vary the spot size of the laser system beam 814 with the zoom beam expander 824 so as to adjust the average power of the laser system beam 814. For example, the spot size can be varied to different sizes that correspond to the variation of the scan velocity of the laser system beam 816. Also, the spot size can be modulated so as to alternate between two or more different sizes, with different modulation periods and duty cycles, so as to alter the average power of the laser system beam 816.

Figure 9:
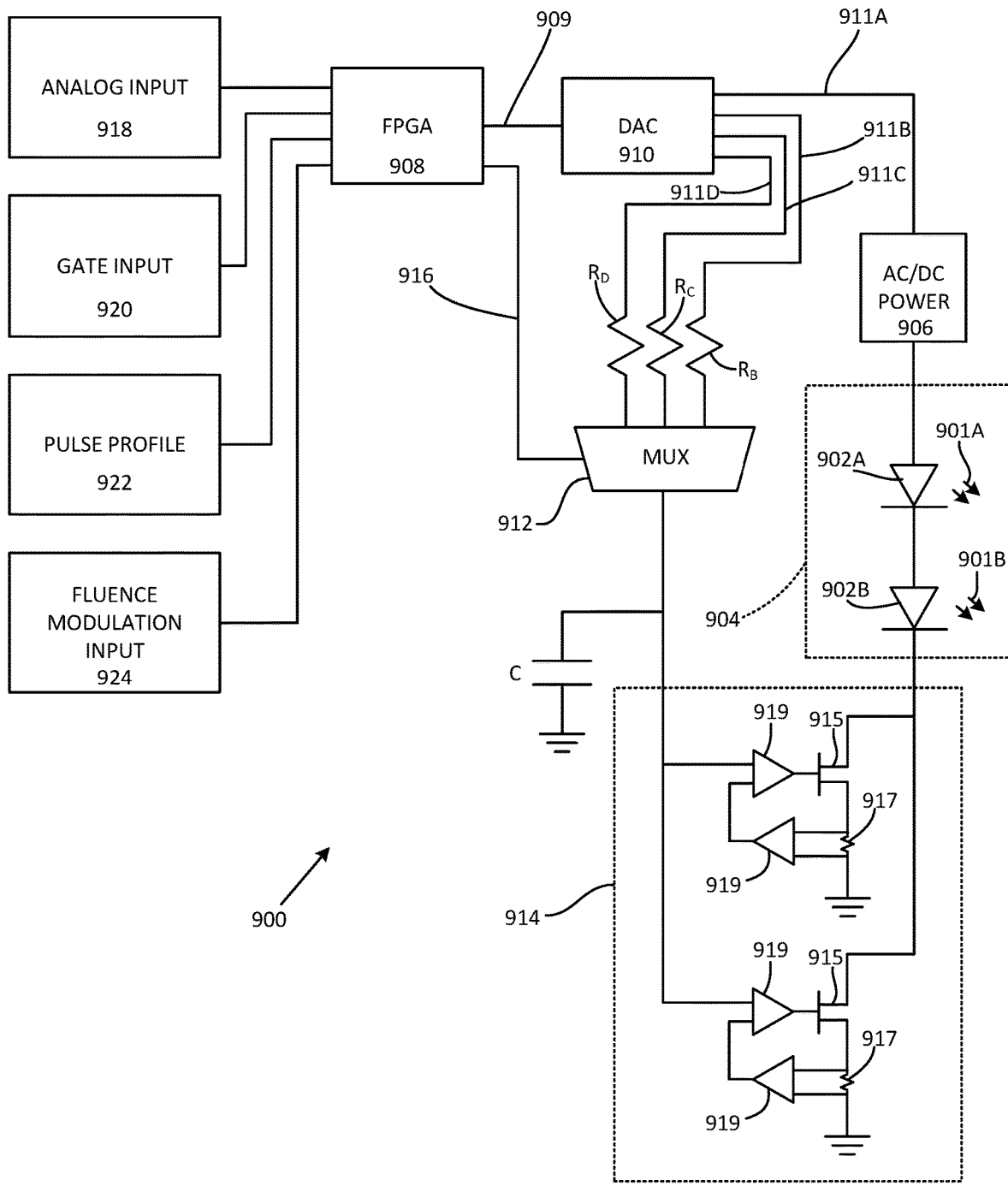
FIG. 9 is another schematic of a laser patterning system.

FIG. 9 shows a laser pump control system 900 that controls the optical outputs 901A, 901B of one or more pump diodes 902A, 902B (typically several) situated in series in one or more pump modules 904. The optical outputs 901A, 901B can be used to directly produce a laser system processing beam in a laser system, such as in so-called direct-diode laser systems, or to pump other gain media to produce a laser system processing beam (e.g., fiber lasers, solid state lasers, disk lasers, etc.). An AC/DC power supply 906 provides a current to the pump diodes 902A, 902B in order to produce the optical outputs 901A, 901B. An FPGA 908, or other similar controller device (e.g., PLC, PLD, CPLD, PAL, ASIC, etc.), is situated to produce a digital output 909 to a DAC 910 that corresponds to a desired pump current for the pump diodes 902A, 902B so as to generate the corresponding pump diode optical outputs 901A, 901B. The DAC 910 converts the digital output from the FPGA into a DAC output 911A having a corresponding voltage and that is received by the AC/DC power supply 906 to generate the pump current.

A plurality of additional DAC outputs, 911B-911D, are coupled to a signal multiplexer 912 situated to select the rise time and fall time of the pump current received by the pump diodes 902A, 902B. The signal multiplexer 912 is coupled to an RC circuit capacitor C and one or more current control circuits 914 situated to control the pump current that generates the optical outputs 901A, 901B from the pump diodes 902A, 902B. For example, a resistor $R_B$ coupled to DAC output 911B can be associated with a longer pump current rise time for the pump diodes 902A, 902B, a resistor $R_C$ can be associated with a shorter pump current rise time, and resistor $R_D$ can be associated with a suitable pump current fall time. Rise times and fall times are typically asymmetric in the pump diodes 902A, 902B so that having different selectable resistance values associated with rise and fall and produce an improved response, such as a shorter rise time and fall time with a constrained overshoot or undershoot. In some examples, adjustable resistors are used, such as digipots, so as to allow a tunable resistance value that can also vary with a digital modulation and produce improved rise time, fall time, overshoot, and undershoot optical response characteristics. A serial bus 916 can communicate a digital modulation command from the FPGA 908 to the multiplexer 912 so as to switch between different rise times and fall times and to digitally modulate the pump current.

The current control circuits 914 can include one or more FETs 915 coupled to current sensing resistors 917, and one or more operational amplifiers 919 that provide control feedback and receive current setpoints from the FPGA 908. Including a plurality of the current control circuits 914 in parallel can spread and dissipate heat across the respective FETs 915 of the current control circuits 917 so as to improve current control precision and reliability. In typical examples, the pump diode 902A has a different forward voltage than the pump diode 902B. Thus, the voltage drop across a FET will vary between pump diode series. The AC/DC power supply 906 can be situated to maintain a suitable FET voltage that corresponds to a constant or consistent heat dissipation. The associated electronic efficiency and reliability of the current control circuits 914 is improved as heat dissipation across the FETs 915 is partitioned and limited. Furthermore, the current control response characteristics of the current control circuits 917 that contribute to the overall response time of the optical outputs 901A, 901B of the pump diodes 902A, 902B are improved, allowing shorter rise times and fall times associated with the resistors $R_B$, $R_C$, $R_D$, and higher digital modulation frequencies. The apportioning of current with the parallel current control circuits 914 also allows selection of current sensor resistor values for the current sensing resistors 917 that are more accurate, further improving response characteristics of the current control circuits 914 and optical outputs 901A, 901B. With fast sample rates from the DAC 910, and with the improved response characteristics of the current control circuits 914, laser diode current can be switched or varied rapidly. In some examples, rise times and fall times for the optical outputs 901A, 901B of less than or equal to 50 µs, 20 µs, 10 µs, 5 µs, or 2.5 µs are achieved, including with short modulations periods, such as less than 100 µs, 50 µs, 20 µs, 10 µs, or 5 µs.

In some embodiments, the FPGA 908 receives an analog signal from an analog input 918 from an external source that has been passed through a signal conditioner and ADC (not shown) The external source, such as an automated system, computer, computer memory or data file, manual control, graphical user interface input, etc., is configured to provide the analog signal based on a desired laser system power level. The laser system can then be pumped by the optical outputs 901A, 901B in order to achieve the desired laser system power level. The FPGA 908 can also receive a gate signal from a gate input 920 that can be associated with the analog signal and the external source providing the analog signal. The gate signal is typically digital and can be configured to provide on and off commands for the pump diodes 902A, 902B so as to turn a corresponding laser system beam on and off. The gate signal and analog signal can also be used to produce an arbitrary waveform for the optical outputs 901A, 901B. In typical examples, the analog signal and the gate signal are coordinated so that a laser system beam is scanned across a target to selectively heat and process material of the target at different power levels and at different locations of the target. A pulse profile from a pulse profile signal input 922 can also be coupled to the FPGA 908 so as to provide an external source to select various features of the laser system beam generated from the pump diodes 902A, 902B. The pulse profile information can be stored in a memory locally or remotely or provided as a signal from an external source. For example, different rise times and fall times can be selected for the pump currents, along with laser system beam repetition rates, power levels, etc.

A fluence modulation signal is received from a fluence modulation input 924 that is also coupled to the FPGA 908 and which can also be coordinated with the analog signal, gate signal, and pulse profile, or it can be separate. The fluence modulation signal can be provided to correct for a fluence deviation associated with the laser system beam being delivered to the target. For example, the analog input may have a limited bandwidth, for example, due to the increased noise typically associated with high frequency analog signals, or the bandwidth may be unsuitable in relation to the dynamics of other laser system components, such as a scanner, or the laser process being performed. The fluence modulation signal can be used to compensate for the bandwidth-limited analog signal or corresponding bandwidth-limited laser system performance by digitally modulating the pump currents in order to achieve a desired fluence at the target during laser processing with the laser system beam produced with the optical outputs 901A, 901B. For example, when a scanning speed decreases, the fluence modulation signal can be received by the FPGA 908 and the FPGA 908 can direct the multiplexer 912 over the serial bus 916 to modulate so as to produce the desired fluence correction at the target.

Having described and illustrated the principles of the disclosed technology with reference to the illustrated embodiments, it will be recognized that the illustrated embodiments can be modified in arrangement and detail without departing from such principles. For instance, elements of the illustrated embodiments can be implemented in software or hardware. Also, the technologies from any example can be combined with the technologies described in any one or more of the other examples. It will be appreciated that some procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope and spirit of the appended claims.

We claim:

1. An apparatus, comprising:
   a 3D optical scanner configured to direct a laser beam to a target along a scan path at a variable scan velocity; and
   a laser spot controller configured to adjust characteristics of a spot of the laser beam based on the variable scan velocity to vary characteristics of the spot at the target along the scan path to adjust a fluence at the target such that the fluence is within a predetermined range along the scan path.

2. The apparatus of claim 1, wherein the laser spot controller comprises a beam expander configured to vary the spot characteristics.

3. The apparatus of claim 2, wherein the beam expander is coupled to an active fiber configured to generate the laser beam in order to provide the variation in the spot characteristics.

4. The apparatus of claim 2, wherein the beam expander comprises a zoom beam expander including entrance group optics and exit group optics, wherein the exit group optics includes one or more optics configured move along an optical axis of the zoom beam expander.

5. The apparatus of claim 1, further comprising a laser beam power detector, wherein the laser spot controller is configured to vary the spot characteristics based on a power of the laser beam detected by the laser beam power detector.

6. The apparatus of claim 1, wherein the laser spot controller is configured to adjust the spot characteristics over time by modulating a spot modulation duty cycle and/or spot modulation period.

7. The apparatus of claim 6, wherein the laser spot controller is configured to adjust the spot characteristics to adjust the average power of the laser beam.

8. The apparatus of claim 1, wherein the laser spot controller is configured to change a size of the spot.

9. The apparatus of claim 8, wherein the laser spot controller is configured to change the size of the spot along one or more axes transverse to a propagation direction of the laser beam.

10. The apparatus of claim 8, wherein the laser spot controller is configured to modulate the size to alternate between two or more different spot sizes.

11. The apparatus of claim 8, wherein the laser spot controller is configured to modulate a collimated width of the laser beam.

12. The apparatus of claim 1, wherein the laser spot controller is configured to vary an average power delivered to the target based on the varying of the spot characteristics.

13. The apparatus of claim 1, wherein the apparatus includes a digital modulator configured to adjust a digital modulation of a power level of the laser beam based on the variable scan velocity.

14. An apparatus, comprising:
   a 3D optical scanner configured to direct a laser beam to a target along a scan path at a variable scan velocity; and
   a zoom beam expander configured to adjust a collimated width of the laser beam based on the variable scan velocity to vary a spot size at the target along the scan path to adjust a fluence at the target such that the fluence is within a predetermined range along the scan path.

15. The apparatus of claim 14, wherein the zoom beam expander includes entrance group optics and exit group optics, wherein the exit group optics includes one or more optics configured move along an optical axis of the zoom beam expander.

16. The apparatus of claim 14, further comprising a digital modulator configured to adjust a digital modulation of a power level of the laser beam based on the variable scan velocity.

17. An apparatus, comprising:
   a zoom beam expander configured to adjust a width of a laser beam to provide the laser beam with a variable spot size at a target;
   a scanner configured to direct the laser beam to the target along a scan path; and
   a digital modulator configured to digitally modulate a continuous-wave power of the laser beam in relation to the variable spot size to provide a fluence at the target within a predetermined fluence range along the scan path.

18. The apparatus of claim 17, wherein the laser beam is directed to the target along a scan path at a variable scan speed and the digital modulation is adjusted so as to maintain the fluence at the target within the predetermined fluence range along the scan path.

* * * * *